United States Patent
Rahman et al.

(10) Patent No.: US 7,653,011 B2
(45) Date of Patent: Jan. 26, 2010

(54) SPANNING TREE PROTOCOL FOR WIRELESS NETWORKS

(75) Inventors: Shahriar I. Rahman, Morgan Hill, CA (US); Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 533 days.

(21) Appl. No.: 11/351,433

(22) Filed: Feb. 10, 2006

(65) Prior Publication Data

US 2006/0280131 A1  Dec. 14, 2006

Related U.S. Application Data

(60) Provisional application No. 60/686,235, filed on May 31, 2005.

(51) Int. Cl.
*H04L 12/28* (2006.01)

(52) U.S. Cl. .................. 370/256; 370/229; 370/238; 370/254; 370/395.31

(58) Field of Classification Search ............. 370/229, 370/238, 254, 256, 395.31
See application file for complete search history.

(56) References Cited

U.S. PATENT DOCUMENTS

| | | | | |
|---|---|---|---|---|
| 5,295,154 A | * | 3/1994 | Meier et al. ............... 370/351 |
| 5,394,436 A | * | 2/1995 | Meier et al. ............... 375/132 |
| 5,428,636 A | | 6/1995 | Meier ........................ 375/202 |
| 5,504,746 A | | 4/1996 | Meier ...................... 370/85.13 |
| 5,673,031 A | | 9/1997 | Meier .................... 340/825.08 |
| 5,726,984 A | * | 3/1998 | Kubler et al. ............... 370/349 |
| 5,740,366 A | * | 4/1998 | Mahany et al. ............. 709/227 |
| 5,748,619 A | * | 5/1998 | Meier ........................ 370/278 |
| 5,790,536 A | | 8/1998 | Mahany et al. .............. 370/338 |
| 5,940,771 A | * | 8/1999 | Gollnick et al. ............. 455/517 |
| 6,032,194 A | * | 2/2000 | Gai et al. .................... 709/239 |
| 6,046,992 A | | 4/2000 | Meier et al. ................. 370/338 |
| 6,084,867 A | | 7/2000 | Meier ......................... 370/338 |
| 6,188,694 B1 | | 2/2001 | Fine et al. ................... 370/402 |
| 6,330,229 B1 | | 12/2001 | Jain et al. ................... 370/256 |
| 6,374,311 B1 | | 4/2002 | Mahany et al. ............... 710/18 |
| 6,400,702 B1 | | 6/2002 | Meier ......................... 370/338 |
| 6,407,991 B1 | * | 6/2002 | Meier ......................... 370/338 |
| 6,445,710 B1 | * | 9/2002 | Perlman et al. ............. 370/401 |

(Continued)

OTHER PUBLICATIONS

R. Chandra, C. Fetzer and K. Hogstedt, "A Mesh based Robust Topology Discovery Algorithm for Hybrid Wireless Networks", AT&T Labs Tech Report, AT&T Research Laboratories, Techical Report, 2002.

(Continued)

*Primary Examiner*—Aung S Moe
*Assistant Examiner*—Benjamin Elliott
(74) *Attorney, Agent, or Firm*—Dov Rosenfeld; Inventek

(57) ABSTRACT

A method of implementing a spanning tree protocol for a wireless network conforming to a wireless network standard, the spanning tree protocol substantially conforming to the IEEE 802.1 standard, including a first wireless bridging node wirelessly transmitting BPDU information to other wireless bridging nodes of the network or wirelessly receiving BPDU information from other wireless bridging nodes, the BPDU information encapsulated in one or more control/management frames, e.g., beacon or probe response frames of the wireless network standard, the BPDU information relating to a spanning tree topology containing the first and other wireless bridging nodes.

54 Claims, 4 Drawing Sheets

U.S. PATENT DOCUMENTS

| | | | | |
|---|---|---|---|---|
| 6,535,490 | B1 | 3/2003 | Jain | 370/256 |
| 6,678,241 | B1 | 1/2004 | Gai et al. | 370/216 |
| 6,701,361 | B1 | 3/2004 | Meier | 709/224 |
| 6,714,559 | B1 | 3/2004 | Meier | 370/449 |
| 6,714,983 | B1 | 3/2004 | Koenck et al. | 709/230 |
| 6,757,298 | B1 | 6/2004 | Burns et al. | 370/473 |
| 6,771,610 | B1 | 8/2004 | Seaman | 370/256 |
| 6,771,666 | B2 * | 8/2004 | Barker, Jr. | 370/475 |
| 6,795,403 | B1 * | 9/2004 | Gundavelli | 370/256 |
| 6,826,165 | B1 | 11/2004 | Meier et al. | 370/338 |
| 6,847,620 | B1 | 1/2005 | Meier | 370/328 |
| 6,891,808 | B2 | 5/2005 | Ishii | 370/256 |
| 6,895,450 | B2 | 5/2005 | Mahany et al. | 710/18 |
| 6,937,576 | B1 * | 8/2005 | Di Benedetto et al. | 370/256 |
| 7,193,975 | B2 * | 3/2007 | Tsutsumi et al. | 370/254 |
| 7,350,077 | B2 * | 3/2008 | Meier et al. | 713/171 |
| 7,483,397 | B2 * | 1/2009 | Meier et al. | 370/256 |
| 2003/0112810 | A1 * | 6/2003 | Nakabayashi et al. | 370/401 |
| 2004/0081171 | A1 | 4/2004 | Finn | 370/395.53 |
| 2004/0103275 | A1 | 5/2004 | Ji et al. | 713/150 |
| 2004/0103282 | A1 * | 5/2004 | Meier et al. | 713/171 |
| 2005/0013260 | A1 | 1/2005 | Ramanathan et al. | 370/256 |
| 2005/0066166 | A1 * | 3/2005 | Chin et al. | 713/165 |
| 2005/0163102 | A1 * | 7/2005 | Higashitaniguchi et al. | 370/351 |
| 2005/0213515 | A1 | 9/2005 | Wakumoto et al. | 370/254 |
| 2005/0220054 | A1 * | 10/2005 | Meier et al. | 370/331 |
| 2005/0223111 | A1 * | 10/2005 | Bhandaru et al. | 709/236 |
| 2005/0243757 | A1 * | 11/2005 | Yagyu et al. | 370/328 |
| 2006/0182076 | A1 * | 8/2006 | Wang | 370/338 |
| 2006/0245376 | A1 * | 11/2006 | Ge et al. | 370/256 |
| 2006/0262733 | A1 * | 11/2006 | Guo et al. | 370/254 |
| 2007/0242602 | A1 * | 10/2007 | Pang et al. | 370/216 |
| 2007/0280184 | A1 * | 12/2007 | Shin et al. | 370/338 |
| 2008/0192691 | A1 * | 8/2008 | Park et al. | 370/331 |

OTHER PUBLICATIONS

E. Royer and C. Toh, "A Review of Current Routing Protocols for Ad-Hoc Mobile Wireless Networks", IEEE Personal Communications, Apr. 1999.

R. Chandra, C. Fetzer, K. Hogstedt, "Adaptive Topology Discovery in Hybrid Wireless Networks", Proceedings of Informatics, 1st International Conference on Ad-hoc Networks and Wireless, Toronto, vol. 16, pp. 1-16, Sep. 20-22, 2002.

PCT International Preliminary Report on Patentability on PCT Application PCT/US2006/015879.

"Understanding Multiple Spanning Tree Protocol (802.1s)," White Paper (Document ID: 24248), Cisco Systems, Inc., San Jose, California, downloaded on Jan 9, 2006 as URL <http://www.cisco.com/warp/public/473/147.pdf>.

"Resource Reservation Protocol", Chapter 48, *Internetworking Technologies Handbook*, Cisco Systems, Inc., San Jose, California, downloaded on Feb. 2, 2006 from http://www.cisco.com/univercd/cc/td/doc/cisintwk/ito_doc/index.htm.

* cited by examiner

WSTP active links

WSTP alternate/backup links

SPANNING TREE PROTOCOL FOR WIRELESS NETWORKS

RELATED PATENT APPLICATIONS

This invention claims benefit of U.S. Provisional Patent Application Ser. No. 60/686,235, filed May 31, 2005 to inventors Rahman et al., titled SPANNING TREE PROTOCOL FOR WIRELESS NETWORKS, The contents of such U.S. Provisional Patent Application Ser. No. 60/686,235 are incorporated herein by reference.

This invention is related to concurrently filed U.S. patent application Ser. No. 11/351,853 to inventors: Kruys et. al., titled "MULTIPLE WIRELESS SPANNING TREE PROTOCOLS FOR USE IN A WIRELESS MESH NETWORK," CISCO11926, assigned to Cisco Technology, Inc., the assignee of the present invention. U.S. patent application Ser. No. 11/351,853 also claims benefit of U.S. Provisional Patent Application Ser. No. 60/686,235. The contents of such U.S. patent application Ser. No. 11/351,853 are incorporated herein by reference.

BACKGROUND

The present invention is related to wireless networks, and in particular to a spanning tree protocol for use with an ad-hoc wireless network to avoid loops in the wireless network.

In the area of local area networks (LANs), and in particular, LAN bridges, spanning tree protocols are known for preventing loops in a bridged (typically wired) network. In particular, the Institute of Electrical and Electronics Engineers (IEEE) has developed a network communication standard IEEE 802.1d entitled, "Media Access Control (MAC) Bridges," originally approved May 31, 1990 (hereinafter "IEEE 802.1d"), and also high-speed (IEEE 802.1w) and high-density (IEEE 802.1s) counterparts. IEEE 802.1d includes a supplement 802.1r—"GARP Proprietary Attribute Registration Protocol (GPRP)" that defines an additional GARP Application aimed at allowing vendor-specific attribute values to be distributed via GARP in a standard and interoperable manner, and allowing vendor-specific attribute values that may have a wider application within other vendors equipment to be made available for more general use. Any of these protocols, and also a collection of these standard protocols is referred to herein as a or the "standard IEEE 802.1 spanning tree protocol," also "standard IEEE 802.1 STP" In brief, the standard IEEE 802.1 protocol describes functions to be performed by a compliant bridge including maintaining the spanning tree topology for the bridge, building and maintenance of a filtering database, relaying and filtering of frames, and transmission of Bridge Protocol Data Units (BPDUs). A BPDU is a special message that bridges transmit to each other to facilitate determination of a spanning tree topology.

Wireless networks are becoming widespread. For example, wireless local area networks (WLANs) that conform to the IEEE 802.11 standard are becoming more and more popular. One way of operating a WLAN is in infrastructure mode according to which some wireless stations operate as access points, and each access point has client stations. All communication from and to a client station is via its access point. WLANS may also operate in ad-hoc mode according to which any station may communicate directly with any other station. Such a wireless network forms a mesh. The present invention is particularly applicable to such mesh wireless networks where, as in a wired mesh, any station could have a wireless link to another station. Such a network is also called a multi-hop wireless network herein.

As in the case of wired networks, it is desirable to avoid forming loops in a multi-hop wireless network. Special purpose protocols that provide similar functionality to the standard IEEE 801.1 spanning tree protocols have been designed. However, there is a desire in the art for working with standard IEEE 802.1 protocols in order to maintain compatibility.

There is therefore a need in the art for combining the process of establishing a radio link in a wireless network with standard IEEE 802.1 spanning tree protocols to decide which links to establish in order to avoid undesirable loops.

The standard IEEE 802.1 spanning tree protocol was originally designed to work over wired Ethernet links and cannot operate until the low-level links are established. In wireless networks such as IEEE 802.11 networks, low-level link establishment is a multi-step process. The blocking/tearing down of established links by a spanning tree process such as used in a wired network may be undesirable. Thus, the standard IEEE 802.1 spanning tree protocol as designed cannot simply operate in a wireless network environment.

Some other limitations in the standard IEEE 802.1 spanning tree protocol when used for multi-hop IEEE 802.11 conforming wireless networks include:

A typical standard IEEE 802.1 spanning tree protocol chooses a root bridge, and further chooses one link over another based on such parameters as the switch-id, the port-id, the bridge-priority, the port-priority and the path cost to the root according to some cost measure. These parameters and path cost calculations based on link speeds, being designed with wired networks in mind, have limited usefulness for radio links. Radio links, on the other hand, have radio link parameters associated therewith, including the radio path loss, the received signal strength, the received signal quality, e.g., as measured by a measure of the EVM of a received signal, and so forth, that are relevant in determining link quality, and thus, that should play a part in selecting paths.

Because of factors such as interference, path loss, multipath fading, and so forth, radio inks, e.g., IEEE 802.11 links are much more likely to temporarily go down than are wired links. There is no provision in the IEEE 802.1 spanning tree protocol for links that temporarily go down.

Spanning tree protocols for wired networks provides path redundancy using alternate and/or backup links. Maintaining such redundant links in wireless networks, e.g., IEEE 802.11 networks, may result in inefficient usage of the available bandwidth. Maintaining such links may further add unacceptable overhead.

Spanning tree protocol for wired networks are designed for fixed Ethernet LANs. Radio links, e.g., Multi-hop wireless mesh networks, such as IEEE 802.11 conforming networks may be mobile in an unpredictable random-like manner.

Thus, there is a need in the art for a WSTP wireless spanning tree protocol that includes a root bridge selection method that incorporate radio parameters, and that otherwise operates substantially as a standard IEEE 802.1 spanning tree protocol.

Prior art in the field of ad-hoc wireless networks includes work on mobility protocols, such as Mobile-IP and on Ad-hoc routing for establishing loop-free topologies in mobile/multihop wireless networks. Note that mobile ad-hoc networks are often referred to as MANETs (Mobile Ad-hoc NETworks) in the literature. For a routing method, see, for example, Elizabeth Royer and C-K Toh "A Review of Current Routing Protocols for Ad-Hoc Mobile Wireless Networks," *IEEE Personal Communications Magazine*, April 1999, pp. 46-55.

Implementations of the IEEE 802.1 spanning tree algorithms are common. It is desirable to not have to modify existing protocol stacks at end stations. Furthermore, it is desirable to not have to modify existing protocol stacks, such as mobile in ad-hoc mobile protocols (MANET protocols) and L3 routing logic in intermediate devices, common in Mobile-IP protocols.

It further is desirable to have a wireless spanning tree algorithm that avoids temporary loops. Temporary loops can be a problem in a bridged, multi-hop wireless network, often resulting in dramatically rapid packet proliferation through the network.

There still is a need in the art for extending spanning tree protocols for ad-hoc wireless networks, in particular, for IEEE 802.11 networks.

SUMMARY

Described herein is a method for implementing a WSTP wireless spanning tree protocol in a wireless station that substantially conforms to the IEEE 802.11 standard such that the station acts as a bridging entity (a "wireless Dbridge") that generates a wireless spanning tree protocol compatible with (so substantially conforming to) a tree as set up by the standard IEEE 802.1 spanning tree protocol, but for wireless networks. Also described herein is a wireless network with one or more wireless Dbridges. Wireless Dbridges typically form bridging entities in a wireless mesh network. In such use, each wardress Dbridge forms a mesh point for the mesh.

One aspect of the invention is that using an instance of the WSTP wireless spanning tree protocol proactively prevents any type of temporary loops by only establishing radio links that are warranted by the spanning tree protocol algorithm.

Another feature of embodiments of the WSTP wireless spanning tree protocol described herein is that such a protocol is almost a plug-and-play into a standard IEEE 802.1 spanning tree protocol, with low impact on existing functionalities, making it easy to integrate into existing products.

Another feature of the WSTP wireless spanning tree protocol described herein is that all spanning tree protocol operations are localized in the wireless bridging devices (the wireless Dbridges, also called mesh points). Hardly any changes in either router or end station operations are needed.

The WSTP wireless spanning tree protocol described herein has the potential to extract tree-like topologies in wireless mesh networks.

One embodiment described herein is a method of implementing a wireless spanning tree protocol in a wireless network conforming to a wireless network standard such that the wireless spanning tree protocol substantially conforms to a standard IEEE 802.1 spanning tree protocol. The wireless network including a first wireless bridging node and at least two other wireless bridging nodes. The method is implemented in the first wireless bridging node. The wireless network standard provides control/management frames for network entities to exchange wireless network information with one or more other wireless network entities. As an example, the wireless network standard provides a mechanism for wireless network entities to wirelessly communicate wireless network information using control/management frames, e.g., to transmit beacon or probe response frames to other wireless network entities to advertise the radio characteristics of the wireless network entity. An example, but not the only example, is the IEEE 802.11 wireless LAN standard. The wireless spanning tree protocol acts to determine a spanning tree topology amongst the wireless bridging nodes, including a root wireless bridging node, The method includes wirelessly transmitting bridging information (BPDU information) in the form of bridging protocol data units (BPDUs) to other wireless bridging nodes of the network encapsulated in one or more control/management frames, e.g., beacon frames (including probe response frames). The BPDU information relates to a spanning tree topology containing the first and one or more other wireless bridging nodes. Each BPDU substantially conforms to a standard IEEE 802.1 spanning tree protocol BPDU, with a path cost designed for wireless communication.

In one implementation, a control/management frame, e.g., a beacon or probe response frame from the first wireless bridging node includes an indication of whether or not BPDU information is included.

A version of the method further includes wirelessly receiving one or more control/management frames, e.g., beacon frames (including probe response frames) encapsulating BPDU information from one or more other wireless bridging nodes of the network, and using the encapsulate BPDU information received in the control/management frames, e.g., beacon frames to modify or discover one or more aspects of the spanning tree topology.

One embodiment also described herein is a first wireless bridging node in a multi-hop wireless network conforming to a wireless network standard. The wireless network includes a plurality of wireless nodes including at least two other wireless network nodes, while the wireless network standard provides control/management frames for network nodes to exchange wireless network information with one or more other wireless network nodes. As an example, the wireless network standard provides a mechanism for wireless network nodes to wirelessly communicate wireless network information using control/management frames, e.g., to transmit beacon or probe response frames to other wireless network nodes to advertise the radio characteristics of the wireless network node. The first wireless node includes a radio transceiver and a wireless MAC protocol processor coupled to the radio transceiver, such that the radio transceiver and MAC protocol processor combination is able to wirelessly send and receive frames substantially conforming to the wireless network standard. The first wireless node also includes a wireless spanning tree protocol processing system coupled to the transceiver and MAC processor, and configured to establishing an active spanning tree topology that specifies the communication pathways between wireless bridging entities in the wireless network, the active spanning tree topology having a root node, the establishing being according to a wireless spanning tree protocol that substantially conforms to the standard IEEE 802.1 spanning tree protocol. The establishing of the active spanning tree protocol includes receiving spanning tree protocol capabilities from other wireless bridging nodes in control/management frames, e.g., beacon frames and probe response frames that encapsulate bridging information ("BPDU information") as bridge protocol data units (BPDUs), and announcing the spanning tree protocol capabilities of the first wireless bridging node by transmitting beacon frames and probe response frames that encapsulate BPDU information as BPDUs. The BPDUs substantially conform to standard IEEE 802.1 spanning tree protocol BPDUs, with a path cost designed for wireless communication.

Also described herein is a bridging method in a first wireless station of a wireless network substantially conforming to a wireless network standard that provides a mechanism for wireless network entities to wirelessly communicate wireless network information using control/management frames, e.g., to transmit beacon or probe response frames to other wireless network entities to advertise the radio characteristics of the transmitting wireless network entity. The wireless network includes a plurality of nodes, the first wireless station and at least one other node operating as wireless bridging entities. The at least one other node of the network operates as a wireless bridging entity compatible with (so substantially conforming to) the standard IEEE 802.1 spanning tree protocol. The bridging method includes maintaining a spanning tree topology determined according to a spanning tree protocol that substantially conforms to an IEEE 802.1 spanning tree protocol using a wireless network path cost measure, the maintained spanning tree topology including a root node, and sending a management/control frame, e.g., a beacon frame or probe response frame encapsulating bridging information (BPDU information) in the form of bridging protocol data units (BPDUs) such that another wireless bridging entity of the wireless network receiving the BPDU information can modify its information on the spanning tree topology.

Also described herein is a means for operating for a standard IEEE 802.1 spanning tree protocol to work in a wireless network conforming to a wireless network standard, the wireless network including a first wireless bridging node and at least two other wireless bridging nodes, the means for providing in the first wireless bridging node, the wireless network standard providing a mechanism for wireless network entities to wirelessly communicate wireless network information using control/management frames, e.g., to transmit beacon or probe response frames to other wireless network entities to advertise the radio characteristics of the transmitting wireless network entity. The means for providing includes means for wirelessly transmitting BPDU information to other wireless bridging nodes of the network encapsulated in one or more beacon frames, the BPDU information relating to a spanning tree topology containing the first and one or more other wireless bridging nodes.

Also described herein is a computer readable carrier medium carrying computer readable code to instruct a processor of a processing system to implement a spanning tree protocol for a wireless network such that the spanning tree protocol substantially conforms to the standard IEEE 802.1 spanning tree protocol. The wireless network includes a first wireless bridging node and at least two other wireless bridging nodes, the processor being in the first wireless bridging node, the wireless network standard providing a mechanism for wireless network entities to wirelessly communicate wireless network information using control/management frames, e.g., to transmit beacon or probe response frames to other wireless network entities to advertise the radio characteristics of the transmitting wireless network entity. The carrier medium includes code to wirelessly transmit bridging information ("BPDU information") as bridge protocol data units (BPDUs) to other wireless bridging nodes of the network encapsulated in one or more control/management frames, e.g., beacon frames, the BPDU information relating to a spanning tree topology containing the first and one or more other wireless bridging nodes.

Another aspect is a method of implementing a spanning tree protocol for a wireless network conforming to a wireless network standard, the wireless spanning tree protocol substantially conforming to the standard IEEE 802.1 spanning tree protocol, including a first wireless bridging node wirelessly transmitting BPDU information to other wireless bridging nodes of the network or wirelessly receiving BPDU information to other wireless bridging nodes, the BPDU information encapsulated in one or more control/management frames, e.g., beacon or probe response frames of the wireless network standard, the BPDU information relating to a spanning tree topology containing the first and other wireless bridging nodes.

Another aspect is a method in a first wireless network entity acting as a first mesh point of a mesh of wireless mesh points in a wireless network that substantially conforms to a wireless network standard. The wireless network standard provides a mechanism for wireless network entities to wirelessly communicate wireless network information using control/management frames, e.g., to transmit beacon or probe response frames to other wireless network entities to advertise the radio characteristics of the transmitting wireless network entity. The method includes running a first instance of a wireless spanning tree protocol that substantially conforms to the standard IEEE 802.1 spanning tree protocol. Running an instance of a substantially conforming wireless spanning tree protocol in a particular wireless network entity includes:

(a) maintaining information on a spanning tree topology for a set of wireless network entities that includes the particular wireless network entity, the spanning tree topology being for wirelessly communicating among the set of wireless network entities, the maintained information including the identity of a root wireless network entity for the spanning tree topology;

(b) wirelessly sending a control/management frame, e.g., a beacon frame and, in the case a probe request frame was received that includes a bridging information request, a probe response frame, the control/management frame, e.g., beacon and probe response frame including an indication that BPDU information is encapsulated, and that further encapsulates BPDU information that substantially conforms to standard IEEE 802.1 spanning tree protocol BPDU information, but with the path cost calculated according to wireless information; and (c) as a result of receiving a control/management frame, e.g., a beacon frame or probe response frame, ascertaining if the received control/management frame encapsulate BPDU information, and if there is encapsulated BPDU information, updating the maintained information on the first spanning tree topology, and accordingly modifying any BPDU information for sending in a BPDU-information-encapsulating control/management frame, e.g., an encapsulating beacon frame and probe response.

In one embodiment, the first mesh point has an uplink to a wired network and is the root of the spanning tree topology of the first wireless spanning tree protocol instance.

Other features and aspects are described herein.

DETAILED DESCRIPTION

Figure 1:
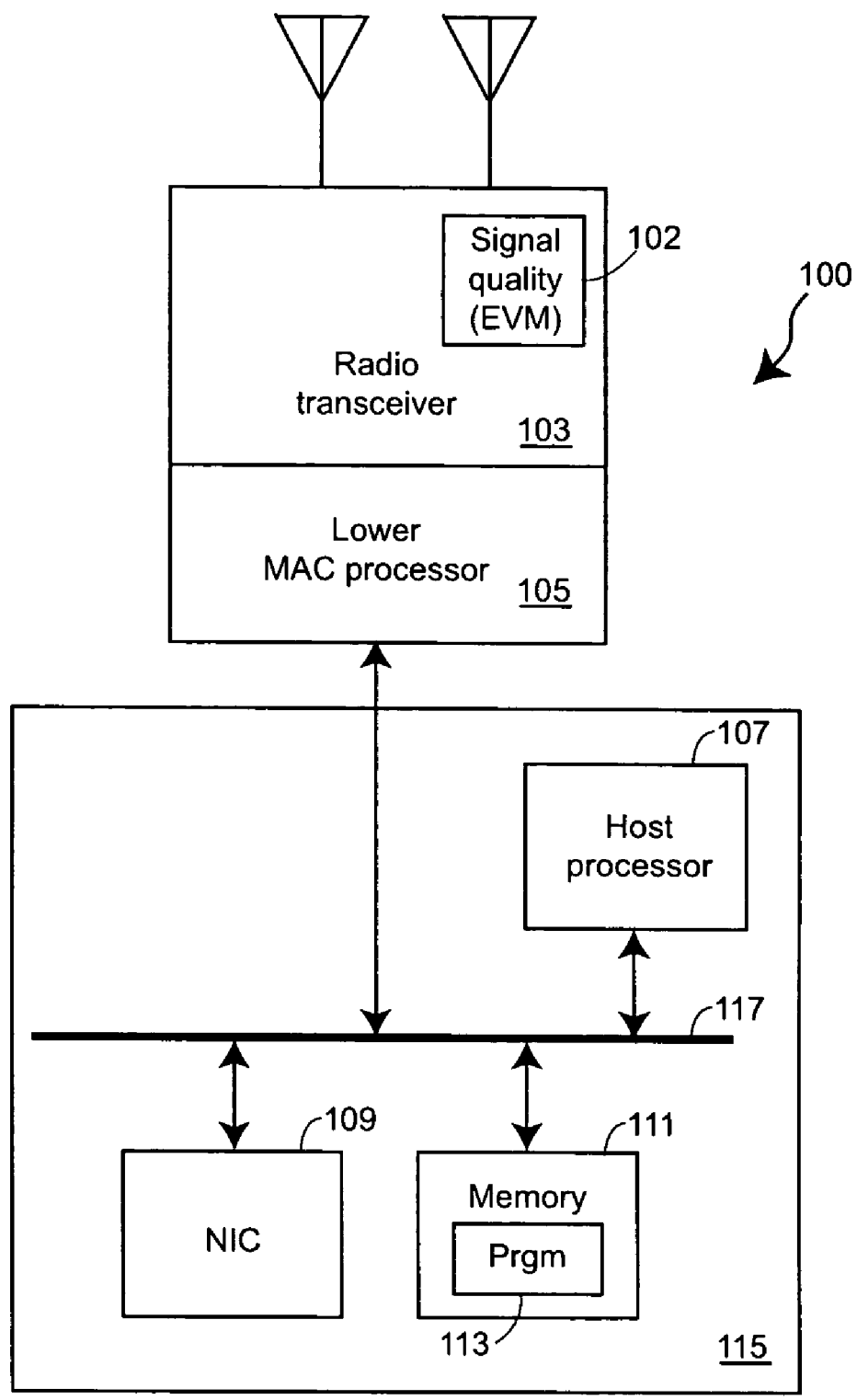
FIG. 1 shows a simplified block diagram of a device running the WSTP wireless spanning tree protocol that includes aspects of the present invention, and well as an 802.1 spanning tree protocol.

Presented herein is a wireless spanning tree protocol that combines aspects of a wireless network standard such as the IEEE 802.11 WLAN standard that provides a mechanism for a wireless node to wirelessly transmit beacon frames or probe responses to other wireless nodes to advertise the radio characteristics of the wireless node, and a standard spanning tree protocol such as the IEEE 802.1 spanning tree protocol. The inventive WSTP wireless spanning tree protocol is called WSTP (for wireless spanning tree protocol) herein. WSTP is consistent with the IEEE 802.1 spanning tree protocol, and is suitable for fixed and mobile; infrastructure, ad hoc and hybrid wireless networks that conform to the wireless network standard. The invention is described with reference to the IEEE 802.11 standard. However, is not restricted to WLANs that conform to the IEEE 802.11 standard, and may easily be adapted to other wireless networks, e.g., any standard that provides a mechanism for wireless network entities to wirelessly communicate wireless network information using control/management frames, e.g., to transmit beacon or probe response frames, or equivalent to other wireless network entities to advertise the radio characteristics of the transmitting wireless network.

Summary of the Standard IEEE 802.1 Spanning Tree Protocol

The standard IEEE 802.1 spanning tree protocol's primary function is to prevent loops in the bridged (typically wired) network. Without such a protocol, in such a (wired) network, multiple active paths between stations cause loops in the network. If a loop exists in the network, the potential exists for duplication of messages, e.g., for broadcast storms in which, when a broadcast frame is sent to a router, each switch receiving the frame will endlessly flood broadcast packets to all ports. When loops occur, some switches or bridges see stations on both sides of the switch. This condition may confuse forwarding algorithms and allows duplicate frames to be forwarded.

A standard IEEE 802.1 spanning tree protocol avoids such loops, and further provides path redundancy by defining a tree structure—the spanning tree topology—that spans all switches in an extended network. When the IEEE 802.1 protocol is implemented, only one active path exists between two nodes of the network. When a bridging entity supporting the standard IEEE 802.1 spanning tree protocol recognizes a loop in the network topology, the bridging entity using the standard IEEE 802.1 spanning tree protocol causes certain redundant data paths into a standby (blocked) state.

Bridges that support the standard IEEE 802.1 spanning tree protocol periodically exchange configuration messages ("BPDU information") using a multicast message called a bridge protocol data unit (BPDU), including a BPDU Hello message. Using the BPDU information, the bridges that support the standard IEEE 802.1 spanning tree protocol will construct a tree architecture—the spanning tree topology.

In more detail, in an arbitrarily connected network, each bridge includes multiple ports. These ports are attached to a number of LAN segments.

Using the standard IEEE 802.1 spanning tree protocol, one and only one bridge is selected by all bridges to act as the "root" of the spanning tree topology; this is the bridge that is root of the constructed tree structure forming the spanning tree topology that spans every local area network (LAN). All other decisions such as which port is blocked, and which ports are put in forwarding mode so they can receive and send traffic, are made with respect to the root bridge. All ports of the root bridge are designated bridge ports.

In a wired network, the "root" is the bridge with the highest priority bridge identifier. Each bridge has a unique identifier, the bridge ID. The bridge ID is typically a combination of a bridge priority and the MAC address of the bridge. The bridge priority is an inverse numerical value such that the lowest value has the highest priority and is typically the root. The highest priority bridge identifier is typically the bridge with both the highest priority (lowest numerical value) and the lowest MAC address among those of the bridge's ports.

For each of the non-root bridges, each bridge has one port that is designated as the "root port." This is the port that has the lowest total path cost to the root bridge, and is the port through which that bridge communicates with the root. On each LAN segment, the bridge that can provide the shortest path cost towards the root is known as the "designated bridge" for the LAN segment. That bridge's port to the LAN segment is the designated port.

The spanning tree protocol chooses one link over another based on a total path cost which is the actual path cost to the root, and, as a tie-breaker, also according to a function of the switch-id and port-id. Each link has a path cost based on the link speed. As noted earlier, in wireless networks, switch-id and port-id may have insignificant meaning, and link speed also may not be meaningful for radio links.

Initially, each bridge assumes itself as the root, and waits to receive BPDU information from other bridges. As BPDU information is received from other bridges, and as the bridge sends information to other bridges, the bridges build the spanning tree topology. If a bridge receives information that is "better" than what it currently has, it will re-compute its information based on the newly received information and then send out updated BPDU information to its neighboring bridges. What is considered "better information" includes information such as a bridge being a better root, e.g., with a higher priority bridge identifier, a shorter path towards the root, or lower cost routes, etc. Eventually through information propagation, all bridges re-learn the active spanning tree topology and configure their ports to forward data frames accordingly. Thus, after the spanning tree protocol determines the lowest cost spanning tree topology, it enables all root ports and designated ports, and disables all other ports. Network packets are therefore only forwarded between root ports and designated ports, eliminating any possible network loops.

Once a stable network topology has been established, in order to adapt the active topology to failures, the root periodically, e.g., every period called the Hello Time, transmits BPDU messages (Hello BPDUs). All bridges listen for Hello BPDUs transmitted from the root bridge. If a bridge does not get a Hello BPDU after a predefined interval (the Max Age), the bridge assumes that the link to the root bridge is down. This bridge then initiates negotiations with other bridges to reconfigure the network to re-establish a valid active network topology. Note that some ports that are in blocked state form backup paths.

Thus, the standard IEEE 802.1 spanning tree protocol continually explores the network. If one network segment in the spanning tree topology becomes unreachable, or if spanning tree protocol costs change, or if the network topology changes, a spanning tree algorithm in the standard IEEE 802.1 spanning tree protocol reconfigures the spanning tree topology and re-establishes the link, e.g., by activating the previously blocked standby path. The standard IEEE 802.1 spanning tree protocol in a wired network does this by enabling and disabling certain ports on a network device based upon negotiations with neighboring devices.

Spanning tree protocol operation is transparent to end nodes in a network, which are unaware whether they are connected to a single local area network (LAN) segment or to a switched LAN of multiple segments.

Figure 4:
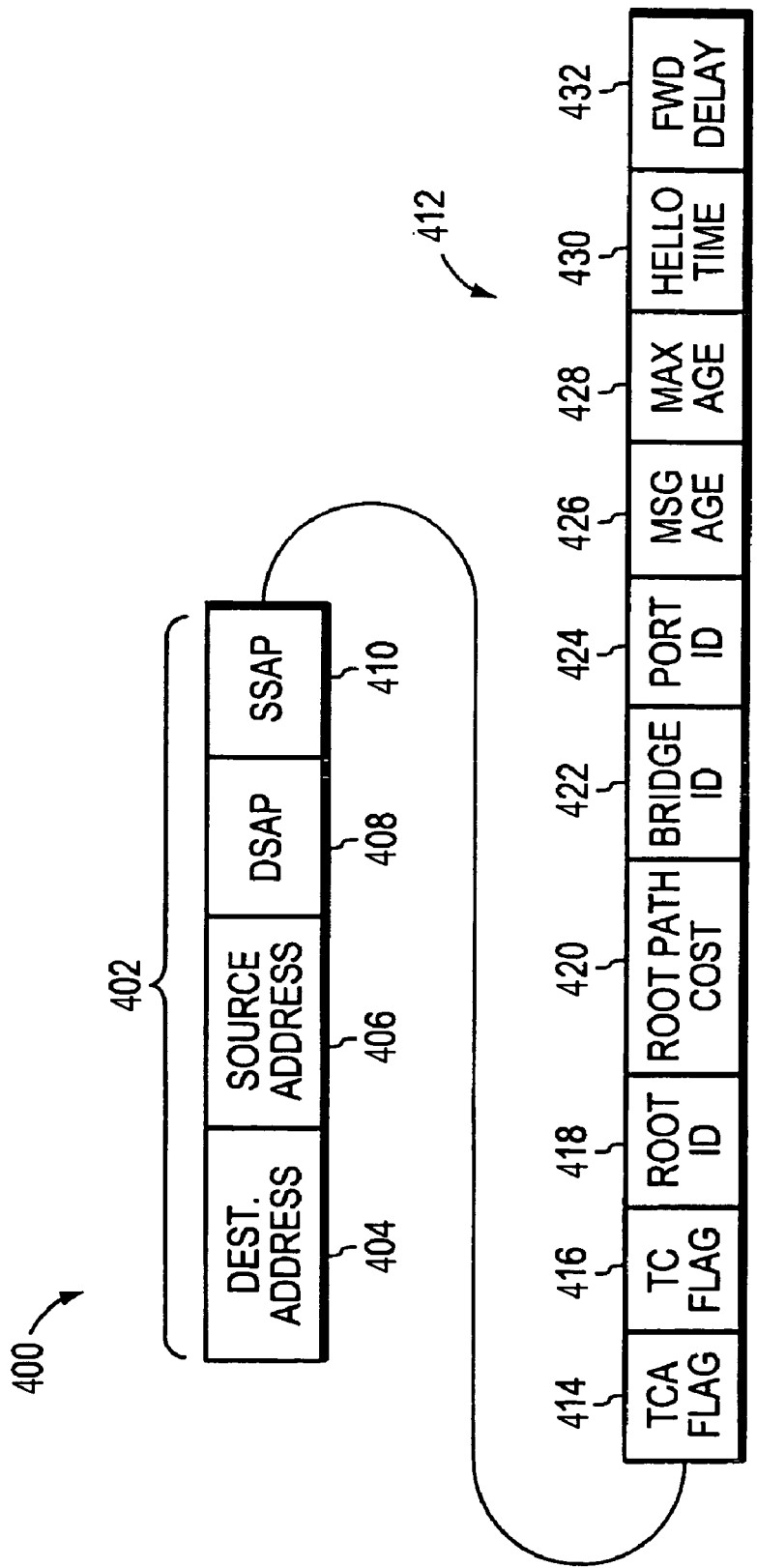
FIG. 4 shows in simplified form the content of a 802.1d BPDU for a wired network.

When the topology changes, the designated bridge for each LAN segment broadcasts, e.g., uses each of its ports to report the following BPDU information to its neighboring bridges: its own identity, the identity of the transmitting port, the identity of the bridge that the transmitting bridge believes to be the root, and the path cost of the path from the transmitting port to the root bridge. In more detail, FIG. 4 is a block diagram of a conventional (wired network) 802.1d BPDU message 400. The BPDU message 400 includes a header 402 compatible with the Media Access Control (MAC) layer of the respective LAN standard. The header 402 comprises a destination address (DA) field 404, a source address (SA) field 406, a Destination Service Access Point (DSAP) field 408, and a Source Service Access Point (SSAP) 410, among others. The DA field 404 carries a unique bridge multicast destination address assigned to the spanning tree protocol, and the DSAP and SSAP fields 408, 410 carry standardized identifiers assigned to the spanning tree protocol. Appended to header 402 is a BPDU message area 412 that also contains a number of fields, including a Topology Change Acknowledgement (TCA) flag 414, a Topology Change (TC) flag 416, a root identifier (ROOT ID) field 418, a root path cost field 420, a bridge identifier (BRIDGE ID) field 422, a port identifier (PORT ID) field 424, a message age (MSG AGE) field 426, a maximum age (MAX AGE) field 428, a Hello Time field 430, and a Forward Ddelay (FWD DELAY) field 432, among others. The root identifier field 418 typically contains the bridge ID of the bridge assumed to be the root and the bridge identifier field 422 contains the bridge ID of the bridge sourcing (i.e., sending) the BPDU. The root path cost field 420 contains a value representing the cost to reach the assumed root from the port on which the BPDU is sent and the port identifier field 422 contains the port number of the port on which the BPDU is sent. An IEEE 802.1r BPDU is slightly different than that for the original IEEE 802.1d form, and of course the present invention is applicable to all BPDU forms.

The following table shows the parameters of each bridge, e.g., a switch that implements the standard IEEE 802.1 spanning tree protocol.

| FIELD | Description |
|---|---|
| Spanning Tree Protocol | This field shows if the switch is enabled to participate in a network compliant with the standard IEEE 802.1 spanning tree protocol. |
| | Root Bridge: The following six fields relate to the root bridge. |
| Bridge ID | This is a unique identifier for this bridge, consisting of bridge priority plus MAC address.<br>Bridge Priority: A parameter used to identify the root bridge in a spanning tree topology. The bridge with the lowest value has the highest priority and is the root. A higher numerical value means a lower priority; thus, the highest priority is 0. |
| Cost to Bridge | This is the cost for a packet to travel to the root in the current Spanning tree topology configuration via the bridge port. The slower the media, the higher the cost. This is 0 if your bridge is the root device. |
| Port ID | Root Port of this switch. This is the index of the port on this switch that is closest to the root. This switch communicates with the root device through this port. This is 0X0000 if your bridge is the root device. |
| Hello Time | This is the time interval (in seconds) at which the root device transmits a configuration message. |
| Max Age | This is the maximum time (in seconds) a device can wait without receiving a configuration message before attempting to reconfigure. |
| Forward Delay | This is the time (in seconds) a device will wait before changing states. |
| | Our Bridge: The following fields relate to the particular device. |
| Bridge ID | This is a unique identifier for this bridge, consisting of Bridge Priority (see above definition) plus MAC address. |
| Hello Time | This is the time interval (in seconds) at which the root device transmits a configuration message. |
| Max Age | This is the maximum time (in seconds) a device can wait without receiving a configuration message before attempting to reconfigure. |
| Forward Delay | This is the time (in seconds) a device will wait before changing states. |
| | Topology: The following two fields detail topology change information. |
| Change Times | The number of times the spanning tree topology has been reconfigured. |
| Time Since Last | The time since the spanning tree topology was last reconfigured |

Each port in a bridge has the following parameters:

The Port Priority: The preference that STP gives this port relative to other ports for forwarding traffic out of the spanning tree topology. A higher numerical value means a lower priority; thus, in one version, the highest priority is 8.

The Port Path Cost: The cost of using the port to reach the root bridge. When selecting among multiple links to the root bridge, the standard spanning tree protocol chooses the link with the lowest path cost and blocks the other paths. Each port "type," e.g., coupled to a link having some known speed has its own default STP path cost.

The WSTP Wireless Spanning Tree Protocol

Aspects of the WSTP wireless spanning tree protocol described herein include enabling L2/L3 switching. Another aspect of the WSTP wireless spanning tree protocol presented herein eliminates the need for modification of protocol stacks at end stations running the IEEE 802.1 spanning tree protocol, mobile in ad-hoc mobile protocols (MANET protocols) and L3 routing logic in intermediate devices, common in Mobile-IP protocols.

One embodiment of the WSTP wireless spanning tree protocol is designed as a shim layer to run between an existing IEEE 802.1 spanning tree protocol stack and an IEEE 802.11 MAC protocol stack, such that the standard IEEE 802.1 spanning tree protocol is slightly modified to accommodate wireless devices, resulting in a wireless spanning tree protocol that substantially conforms to the standard IEEE 802.1 spanning tree protocol.

FIG. 1 shows a simplified block diagram of a device 100 running an IEEE 802.11 MAC protocol stack, and a WSTP wireless spanning tree protocol stack that includes an IEEE 802.1 spanning tree protocol stack, and the shim layer to the IEEE 802.1 spanning tree protocol stack. The resulting WSTP wireless spanning tree protocol stack substantially conforms to the standard IEEE 802.1 spanning tree protocol. The device 100 includes a radio transceiver 103 coupled to one or more antennas for transmitting and receiving messages, e.g., according to one or more of the IEEE 802 such as IEEE 802.11b, IEEE 802.11a, and/or IEEE 802.11g. In one embodiment, the transceiver includes a signal strength calculator 102 that, in one version, provides a measure of the EVM of the received signal. The transceiver 103 is coupled to a lower MAC processor 105 that carries out low-level MAC processing. The Lower MAC processor 105 is coupled to a first processing system 115 that includes at least one processor, shown as a single processor 107, a network interface (NIC) 109 to couple the device to a wired network, and a memory subsystem 111. These elements of the first processing system 115 are coupled by a bus subsystem 117 shown here as a simple bus. Details of the bus subsystem and other components are not shown in detail, and those skilled in the art will understand, for example, that the bus subsystem may contain several busses, as is common.

The IEEE 802.11 MAC protocol stack is implemented by the higher MAC functions together with the lower MAC functions carried out by hardware MAC processor 105. The higher MAC functions are implemented as code that instructs the processor 107 of the first processing system 115 to so implement these higher MAC functions. Aspects of the present invention, including the implementation of WSTP wireless spanning tree protocol shim layer as well as at least parts of a standard IEEE 802.1 spanning tree protocol also are in the form of code that when running on the processor 107 of the first processing system 115 causes the processing system to implement the spanning tree protocol. All the code is shown as code 113, although it would be understood by those in the art that not all instructions of such code are in the same memory at the same time. Thus, the device 100 includes a carrier medium carrying computer readable code configured so that the first processing system 115 when one or more of the system's processors execute the code implements the WSTP wireless spanning tree protocol as described herein.

The combination of the hardware MAC processor 105 and the first processing system 115 forms a processing system coupled to the radio transceiver and that operates as a software/hardware entity in device 100 capable of running the wireless spanning tree protocol. This device 100 so running the WSTP wireless spanning tree protocol forms an IEEE 802.11 bridging entity. Examples of such an IEEE 802.11 bridging entity include, but are not limited to: an access point, an IEEE 802.11 repeater, an IEEE 802.11 workgroup bridge, and so forth. In general, such an entity is called a "wireless bridging node" herein and also a "wireless Dbridge" herein. Wireless Dbridges are typically used as the wireless bridging entities in a wireless mesh network of several such wireless bridging nodes. In such an arrangement, each wireless bridging node forms a wireless mesh point for the mesh.

Figure 2:
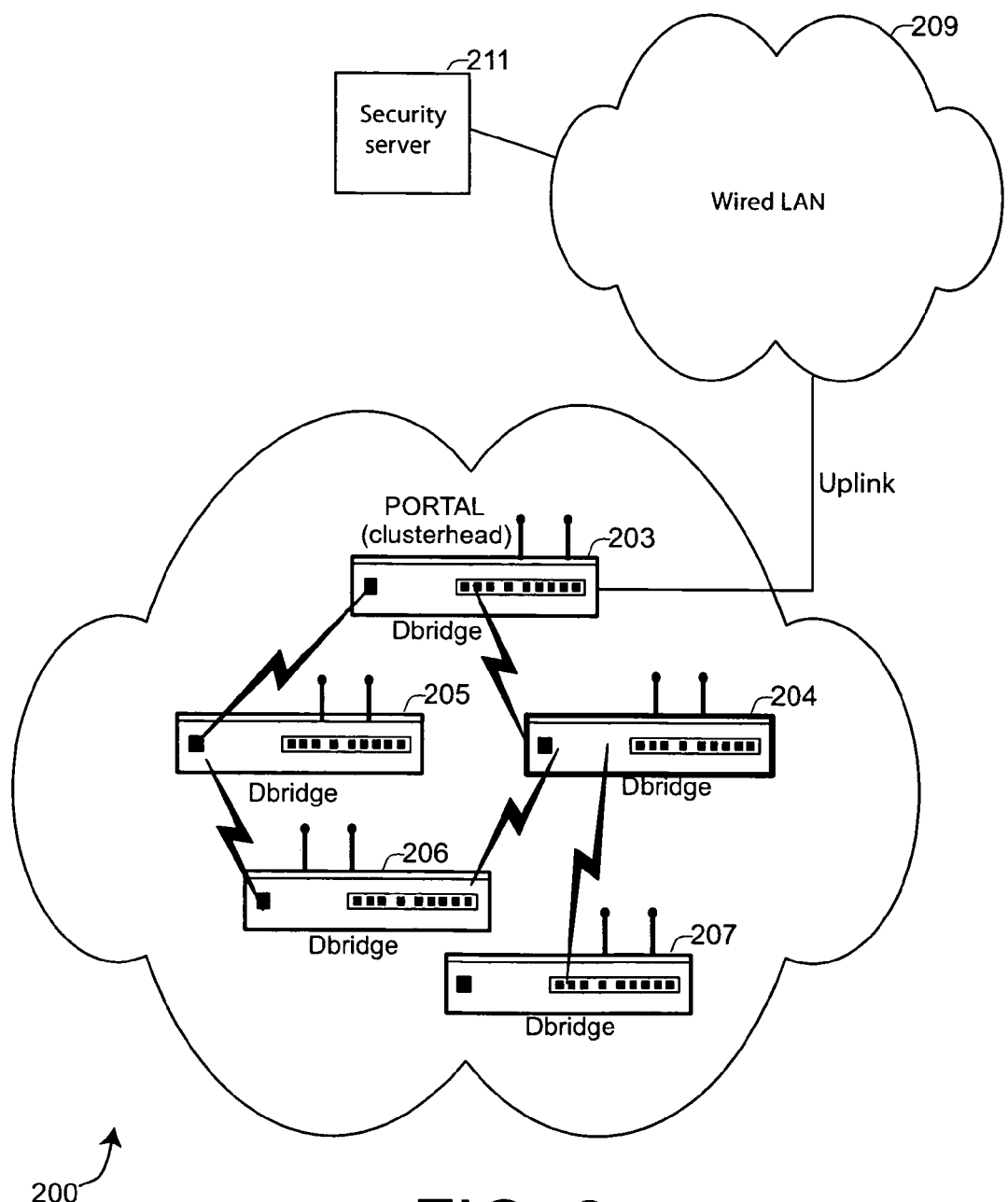
FIG. 2 shows a simple wireless mesh network that includes devices as described in FIG. 1 to illustrate aspects of the present invention.

One aspect of the WSTP wireless spanning tree protocol is establishing a tree topology between wireless Dbridges using a wireless variant of the standard IEEE 802.1 spanning tree protocol. In one mesh wireless network embodiment, every mesh point (mesh node) is a wireless Dbridge. To illustrate aspects of the present invention, FIG. 2 shows an exemplary wireless mesh network 200 that includes devices 203, 204, 205, 206, and 207, each as described in FIG. 1. One of the devices, 203, acts as a portal providing an uplink to a wired local area network (LAN) 209. In one embodiment, the LAN 209 includes a security sever 211 to authenticate nodes of the network, including of the wireless network.

One or more aspects of the WSTP wireless spanning tree protocol invention aid a substantially standard IEEE 802.1 spanning tree algorithm in establishing a loop-free tree topology in a wireless network. The established topology is called the active topology, also the active spanning tree topology, and also the active spanning tree topology herein In the most complex case, the topology is one over which either L2 or L3 forwarding can be used in multipath, multihop, and/or meshed wireless networks. L2/L3 forwarding is favored, given the elimination of any need of modified protocol stacks at end stations, common in MANET protocols, and L3 routing logic in intermediate devices, common in mobile IP protocols.

Aspects of the inventive WSTP wireless spanning tree protocol are now described in more detail with the simple example network of FIG. 2.

Consider first a standard IEEE 802.1—spanning tree protocol, i.e., operating in a wired network. Using such a protocol, a device announces its spanning tree protocol capabilities by sending BPDU Information in the form of BPDU messages of the form shown in FIG. 4 (for 802.1d). This exchange of messages in a wired network results in:

(a) The election of a unique switch to act as the root bridge for the active spanning tree topology network topology.
(b) The election for each LAN segment of a designated bridge.
(c) The removal of loops in the network by placing any redundant bridge ports, e.g., non-root ports and non-designated ports in a backup blocked state.

According to one aspect of the present invention, with the inventive wireless spanning tree protocol, a wireless Dbridge announces its spanning tree protocol capabilities in IEEE 802.11 control/management frames that encapsulate the BPDU information, so that wireless Dbridges receiving the BPDU information can participate in forming the spanning tree topology. The remainder of the description will be in terms of the control/management frames that encapsulate the BPDU information being beacons and probe response frames that encapsulate the information. Those in the art will understand that the invention is applicable to encapsulating the BPDU information in other control/management frames. How to modify the details described herein to accommodate encapsulating BPDU information in other control/management frames will be clear and straightforward to those in the art. Thus, the IEEE 802.11 protocol is very slightly modified so that BPDU information is included in beacons and probe responses. In one embodiment, a flag is used in a beacon frame or probe response that includes BPDU information. In another embodiment, the inclusion itself acts as the indication that the beacon frames or probe response includes one or more BPDUs. In the case the flag is included in a beacon or probe response to indicate whether or not BPDU information is included, in one embodiment, the indication is in a field called the "Capability field," e.g., B14, of the beacon or probe response. This provides for WSTP wireless spanning tree protocol-capable-devices such as a wireless Dbridges to identify each other by examining beacons and probe responses.

Note that so modifying the IEEE 802.11 protocol still maintains a wireless MAC protocol stack that substantially conforms to the IEEE 802.11 standard.

In one embodiment, BPDU information is encoded into a beacon or probe response as an information element, e.g., 0x40. Such BPDU information encapsulation provides for a particular wireless Dbridge receiving a beacon or probe response to discover a spanning tree topology in the wireless Dbridge's vicinity, and further provides for a particular wireless Dbridge to find the best path to the root bridge of the tree.

One difference between a wired bridge and a wireless Dbridge is that a wireless DBridge is in communication between one and only one other wireless station, while a wired ridge has a plurality of ports connected to LAN sections.

One aspect of the invention is that a wireless Dbridge can discover the best path to the root bridge of a spanning tree topology prior to establishing radio links with other wireless Dbridges. By determining such paths prior to establishing radio links, even temporary loops are avoided.

The size of a BPDU is typically in the range of 300-600 bytes and can be up to 1200 bytes. Thus, a beacon frame or probe response frames can easily accommodate BPDU information.

As described in FIG. 4 and in the table above that describes parameters in the standard IEEE 802.1 spanning tree protocol, a bridging device maintains several spanning tree protocol times: the Hello Time is the time between each Bridge Protocol Data Unit (BPDU) that is sent, e.g., by the root device; the Forward Delay is the time a device will wait in the listening and learning state before changing states; and the Max Age is the maximum length of time a bridging device waits without receiving a configuration message before attempting to reconfigure, i.e., the maximum time the device saves the current configuration information.

In one embodiment, for a wireless Dbridge that broadcasts BPDU Information in beacon frames, the spanning tree protocol Hello Time, Forward Delay and Max-Age parameters are a function of the beacon interval of the wireless Dbridges, and in particular, an integer multiple of the beacon interval. In one embodiment, the multiple is configurable, e.g., by a network administrator.

IEEE 802.11 MAC protocol provides not only for broadcasts of beacons, but also for stations to request such information using a probe request frame. Another aspect of the invention provides for a wireless Dbridge to request spanning tree protocol information using a probe request that includes a "BPDU Request" field. Thus, a wireless Dbridge that wishes to join an up-and-running spanning tree topology can request the spanning tree protocol information. Similarly, a wireless Dbridge that lost connection to a spanning tree topology and needs to quickly re-establish the up and running spanning tree topology can request the spanning tree protocol information.

A second wireless Dbridge as a result of receiving such a probe-request that includes a BPDU Request replies by transmitting a probe response frame that includes the BPDU information element. The requesting wireless Dbridge receives probe response frames from at least one responding wireless Dbridge, and preferably establishes a radio link with the responding wireless Dbridge that provides the least path cost to the root bridge, and thus rapidly transitions the link to forwarding state.

There may be some implementations of the IEEE 802.11 standard that do not permit using beacon frames that include a BPDU information element. In such an implementation, in one embodiment, a wireless Dbridge sends a probe-request so that it can receive BPDU information, and the BPDU information is included in probe-responses as described above.

Whether BPDU information is communicated to a wireless Dbridge by the wireless Dbridge waiting for beacons with such BPDU information, or in probe responses with such BPDU information as a result of probe requests, having any loops, even temporary loops is avoided by not allowing any radio links to be established unless explicitly directed by spanning tree protocol process.

Path Cost Calculation

Another aspect of the invention is that the BPDU information encapsulated in beacons or probe responses includes one or more radio parameters for path cost calculation. In one embodiment, the radio parameters include one or more of: the received signal strength, the received signal quality, the available transmission power, a parameter called the wireless Dbridge mobility, and the hop count. In one embodiment, the path cost is a weighted sum of at least two of the included radio parameters. In one version the path cost is a weighted sum of all these parameters, in particular, the path cost, denoted Path_cost is:

$$\text{Path\_cost} = w1*\text{signal\_strength} + w2*\text{transmission\_power} + w3*\text{mobility} + w4*\text{signal\_quality} + \text{hop\_count}.$$

where * is multiplication, and w1, w2, w3 and w4 are weight factors configurable to give relatively more weight to those factors deemed more important to a wireless Dbridge.

Note that those in the art will understand that in determining the weighted sum, each of the radio parameters is appropriately scaled and normalized. In one embodiment, signal_strength is the signal strength mapped from dBM to an unsigned integer index, transmission_power is the transmission power mapped from dBM to an unsigned integer index, mobility is a configurable integer parameter that has a pre-defined maximum value indicating fixed, and a pre-defined minimum value indicating that sending device is highly mobile, and hop_count is an integer indicating the number of hops from the root bridge, with a single increment of 1 for each hop away from the root bridge. Recently designed wireless stations include a measure of the received signal quality, e.g., as a measure of the EVM of the received signal. For such stations, one embodiment includes in the path cost, signal_quality, a measure of the received signal quality, e.g., as indicated by the EVM of a received signal, scaled to an integer value.

In the case the network includes stations that do not provide a signal quality, a default value is used for such stations.

In another embodiment, the Path_cost is $$\text{Path\_cost} = w1*\text{signal\_strength} + w2*\text{transmission\_power} + w3*\text{mobility} + \text{hop\_count}.$$

Selecting the weightings w1, w2, and w3 (and w4) gives more weight on whichever factor is more important for a wireless bridging entity. In one embodiment, selecting the weights is based on policy and administered as per a given network. Thus, a public network, a military network, and an emergency mesh network may have different relative values, with (different) default values provided for each type of network. Battery-operated wireless bridging entities may have higher w3 and a mobile wireless bridging entity may have higher w4. Note also that the path cost weightings are also configurable based on the type of IEEE 802.11 radio-link, e.g., IEEE 802.11a, IEEE 802.11b or IEEE 802.11g, as well as user specifications.

In one embodiment, each wireless Dbridge determines path cost to the root. Initially, a wireless Dbridge starts with itself as the root and waits to receive better path cost information in beacons or probe responses.

Each wireless Dbridge maintains a data structure, in one embodiment, a table called a path cost table that stores, e.g., caches path costs so calculated according to information provide by other wireless Dbridges as BPDU information. The path cost table thus tabulates a wireless Dbridge's own past cost parameters, such as signal strength, transmit power, and so forth, and also the path costs of neighbors from which the wireless Dbridge can and does directly receive beacons and probe responses. Thus, the path cost table provides information on neighbors including the wireless link cost to each neighbor.

Note that each Dbridge further maintains a Bridge forwarding table that provides information on the active network topology as it is learned. The structure of the Bridge Forwarding Table is very similar to that used in the standard 802.1 protocol, with an addition to each entry (called the Bridge Table Entry or BTE) being associated radio/channel information to replace the port information of an IEEE standard 802.1 spanning tree protocol. The Bridge forwarding table of a wireless Dbridge is also called a "WSTP table."

A wireless Dbridge sends BPDU information that includes both path cost and its priority. A Dbridge receiving the BPDU information combines BPDU information received from other wireless Dbridges, and selects the root bridge, as well as the best path to the root. The path cost table information is fed to the standard IEEE 802.1 spanning tree protocol process as necessary to revise the tree and provide information to other Dbridges, e.g., in beacon frames if the system supports such beacons, or in probe response frames when queried by other wireless Dbridges.

When a tie-breaking process is necessary because equal cost paths emerge, in one embodiment, tie-breaking is based on radio signal parameters, e.g., one or both of signal strength and signal quality. In a particular implementation, equal cost paths are decided based on the following parameters in order:

1. Priority.
2. Received signal strength.
3. Transmission power available.
4. Mobility (MOB).

In one embodiment, one or more external parameters also are used for tie breaking rather than only locally derived information as described in 1 to 4 above. For example, suppose there are two paths A to B to C that have equal cost. In one embodiment, A chooses one of these paths to C based on the A to B path cost.

In any wireless Dbridge, once the spanning tree protocol Forward Delay time expires on a wireless Dbridge, that wireless Dbridge establishes a point-to-point radio-link with the wireless Dbridge providing the least-cost path to the root bridge. This is the wireless equivalent to a bridge placing its root port in the forward state. Note that no wireless link need occur until the spanning tree topology has been calculated and the wireless Dbridge is ready to change states.

The WSTP Wireless Spanning Tree Protocol in Partially Meshed Networks

One aspect of the WSTP wireless spanning tree protocol is its ability to work in peer-to-peer or ad hoc fully or partially meshed networks and in hybrid networks.

A wireless network typically includes one or more uplinks, e.g., L3 routed WAN or Satellite or Ethernet uplinks. A wireless network may be an infrastructure network, in which all communication is via access points that have an uplink. In such a network, each access point that has an uplink acts as a wireless Dbridge; there really is no need for the wireless aspects of the WSTP wireless spanning tree protocol, as the bridging component is via a wired network. However, because the WSTP wireless spanning tree protocol is compatible with (so substantially conforming to) the standard IEEE 802.1 spanning tree protocol for wired networks, the WSTP wireless spanning tree protocol works for infrastructure wireless networks.

In an ad hoc network, only peer-to-peer connections between wireless bridging entities may be allowed, with no uplink. By making these bridging entities wireless Dbridges, the WSTP wireless spanning tree protocol works in such an ad hoc network.

In a hybrid network, one or more bridging entities—wireless Dbridges—have uplinks. Another aspect of the invention is the ability of the WSTP wireless spanning tree protocol to also work in such a hybrid network.

In one embodiment, the selection of the root bridge takes into account whether or not there is an uplink at a wireless Dbridge. Wireless Dbridges with no uplink have the lowest priority, and are so advertised, while a wireless Dbridge that has an uplink has a significantly higher priority, and is advertised so. Thus, such a wireless Dbridge with an uplink is likely to eventually be selected as the root bridge.

If there is one wireless station with an uplink, that station is selected as the root wireless Dbridge in the wireless network. When there are multiple wireless Dbridges that have an uplink, in one embodiment, priority of the wireless Dbridge takes into account the link speed of the uplink, with wireless Dbridges with no uplink having the lowest priority. Thus, in such an embodiment, a single root bridge is chosen for the wireless network, and other wireless Dbridges are blocked. However, this approach implies not using all available resources. In an alternate embodiment, if there are multiple wireless Dbridges with uplinks, each wireless Dbridges with an uplink forms a separate spanning tree topology.

Current IEEE 802.11 networks often have a root bridge that has an Ethernet link, e.g., with a directly-connected repeater access point or workgroup bridge. This wireless network root bridge is for a single radio link and is orthogonal to a spanning tree topology root bridge. If both the wireless network root bridge and the spanning tree protocol root bridge must co-exist, then in one embodiment, the wireless network root bridge is selected to be the one closer to the spanning tree protocol root bridge.

Backup Paths

IEEE 802.1 wired spanning tree protocols provide alternate backup paths, e.g., operational links that are blocked. One aspect of the present invention is that a wireless spanning tree protocol provides alternate and/or backup links. This is carried out by:

A) Maintaining a list of potential alternate and/or backup wireless Dbridges in the path cost table on each wireless Dbridge. In one embodiment, the path cost table in a wireless Dbridge maintains an attribute for each wireless bridging entity available for possible future associations that is indicative of the bridging entity's potential as a wireless bridging entity.

In one embodiment, the path cost table is updated periodically and whenever a beacon/probe response arrives with updated BPDU information. Should the current root link go down, a wireless Dbridge can quickly select the best wireless Dbridge from the path cost table, and re-establish a link to the root bridge. The procedure described below for leaving and joining the wireless network are followed.

B) Establishing dormant alternate and/or backup links with wireless Dbridges, and activating such a dormant link when an active link goes down.

Figure 3:
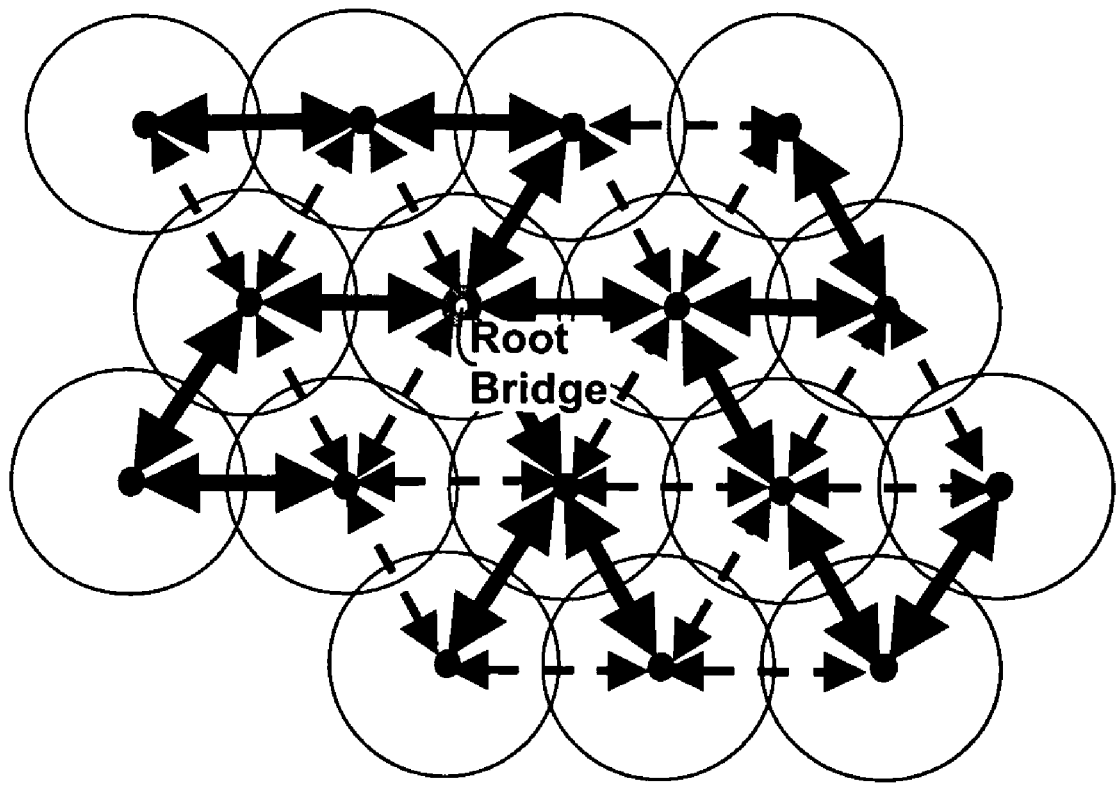
FIG. 3 shows an example of a wireless spanning tree protocol-based mesh network.
Figure 3:
Figure 3:

FIG. 3 shows a simple exemplary wireless network with a set of wireless Dbridges with active links, and alternate/backup links.

Both methods A and B use the included spanning tree protocol stack on a wireless Dbridge to select alternate and/or backup wireless Dbridges/links. The former method A requires explicitly establishing a link when an active spanning tree protocol link fails whereas the latter can just activate an already established link by sending a "wakeup" message to the alternate/backup wireless Dbridge. Hence, the second method provides for faster convergence of the network to the final spanning tree topology. The second method, however, requires more wireless bandwidth because a spanning tree protocol always blocks links from the children. In one embodiment, the WSTP wireless spanning tree protocol makes alternate/backup wireless Dbridges aware of which dormant links from such wireless Dbridges are going down.

Joining and Leaving the Network: Mobility

Another aspect of the invention is that the WSTP wireless spanning tree protocol enhances support for mobility aspects such as a sub-tree of the network leaving or joining the wireless network, a node, e.g., a wireless Dbridge leaving or joining the wireless network, and a sub-tree or a node, e.g., a wireless Dbridge switching to a better link in the wireless network.

IEEE 802.11—conforming bridges are always listening for beacons, or can explicitly request a probe-response using a probe-request. By including support for mobility-related operations as BPDU information in beacons and probe-responses, one aspect of the invention is providing for these mobility-related operations without requiring re-calculation of the spanning tree topology.

In one version, each of these mobility-related operations are supported by one or more of the following relatively simple operations:

Pre-Attach: Negotiate security and QoS parameters with a wireless mesh point.

Attach: Establish a logical spanning tree protocol link with a wireless mesh point.

Detach: Tear down a logical spanning tree protocol link with a wireless mesh point.

Register: Send the wireless mesh point and station addresses of all the children, including both hardware and network addresses, as gratuitous ARP messages to 'add' to all parent Bridge Tables.

Deregister: This is a combination of "Register" and "Detach."

Path-Update: In some embodiment, this is the same as "Deregister" but outbound.

As a first example, suppose a first wireless Dbridge detects loss of a link inbound towards the root. A Deregister message is sent from the first wireless Dbridge. Upon receiving this message, a second wireless Dbridge deletes all entries of the lost sub-tree in its forwarding table. Without further mechanisms, the higher the lost wireless Dbridge is in the active topology, the longer it takes for the topology to re-converge. One aspect of the invention includes not re-calculating the tree but rather continuing using the principal spanning tree protocol instance as the one with the sub-tree which contains the root. This aspect includes keeping the forwarding tables up-to-date in all wireless Dbridges in the rooted sub-tree. Thus, the spanning tree protocol instance is preserved.

Consider now a wireless mesh point that is not part of an up and running wireless spanning tree protocol. Such a wireless mesh point may advertise itself as the root bridge and as having a better path cost then some wireless mesh points that are part of the wireless spanning tree topology generated by the protocol instance. It is not desirable for wireless mesh points that are part of a WSTP wireless spanning tree topology to give into such claims. The link quality with the new wireless mesh point may not be acceptable or the relevant part of the network may not be able to accept further wireless mesh points due to capacity limitations, QoS considerations, and so forth. In one aspect of the invention, a make-before-break approach is followed, according to which a wireless mesh point goes through three steps to join the network:

(1) pre-establishing itself using Pre-attach, wherein the wireless Dbridge negotiates with a potential low-cost link to ensure that all radio characteristics are indeed acceptable and that the link can accept additional wireless Dbridges;

(2) deregistration using Deregister in the case (1) succeeds; and (3) joining the network using Attach.

Only a wireless mesh point in the current spanning tree topology of the current protocol instance can claim to be a root. All wireless mesh points that are part of a current spanning tree protocol instance maintain a flag such that they will not give into the claim of a new wireless mesh point wanting to join as the root. All wireless mesh points that are part of a current spanning tree protocol instance must flag such "extended beacons" or "extended probe responses" so that new/re-establishing wireless mesh point can quickly establish a link upon receiving BPDU information rather than by going through a relatively long learning stage.

When the spanning tree topology is first established, the root bridge sends a unique wireless spanning tree topology-ID to all its children when the spanning tree topology is first established. This wireless spanning tree topology-ID can be the root bridge-ID. As it is already in the BDPU, this method is efficient. All wireless Dbridges under this root bridge match BPDU information elements they receive in beacons and probe-responses against the new wireless spanning tree topology-ID, and filter all unmatched ones. Only a wireless Dbridge belonging to the wireless spanning tree topology-ID can transform to a root bridge should the current root bridge fail. All wireless Dbridges advertise the wireless spanning tree topology-ID in the BPDU information element so that a new wireless Dbridge/sub-tree can join the network quickly rather than going through long listening/learning states. Any new wireless Dbridge wanting to join this spanning tree topology must perform a Pre-Attach operation to increase the probability of success of an Attach.

In another embodiment of the invention, a WSTP wireless spanning tree protocol includes a separate, low-rate channel that is available for control messaging purposes. Such a low-rate channel substantially increases the reach of beacons (and probe responses). One wireless Dbridge embodiment includes a first wireless transceiver and a second wireless transceiver for the separate control channel. As an example, the first wireless transceiver can be actively forwarding data while the wireless Dbridge scans for BPDUs in the control channel using the second wireless transceiver.

In an alternate embodiment, a wireless Dbridge includes a single wireless transceiver, and a mechanism to go off-channel, e.g., to the low-rate control channel to scan for beacons containing BPDUs whenever necessary.

Note that the inter-wireless Dbridge links are logical spanning tree protocol links and their relationships with physical radio channels do not affect the wireless spanning tree protocol.

Another aspect of the invention includes providing a spanning tree protocol link to a distant wireless Dbridge with weak radio signals. One embodiment is a keep-alive method in a wireless Dbridge network that includes: a parent wireless Dbridge listening for beacons (or probe-responses) from the distant wireless Dbridge encapsulating an "I'm alive" BPDU message, waiting for a pre-defined number of beacons missed; and only tearing down the radio-link after the pre-defined number of beacons are missed. In one version, the pre-defined number is tweaked according to the nature of the network.

Another aspect of the invention provides for efficient authentication. Consider a network containing an uplink, the uplink in communication with a trusted central security server, e.g., located somewhere in the LAN or WAN of the uplink. Each wireless Dbridge is able to authenticate itself, including establishing security credentials with the central security server. In one embodiment, once the initial security credentials are established, each wireless Dbridge in a WSTP wireless spanning tree protocol instance trust each other, and the root bridge stores, e.g., caches security credentials of all members of its tree. This ensures all future re-authentications need not traverse a larger network than the spanning tree topology itself. Such a WSTP wireless spanning tree protocol is compatible with (so substantially conforming to) existing encryption and authentication mechanisms.

In accordance with yet another aspect of the invention, after a WSTP wireless spanning tree protocol instance is established, efficient data forwarding is achieved by the "Register" process with both wireless Dbridge and station addresses. According to one embodiment, a wireless Dbridge provides "Proxy ARP" services for stations and other wireless Dbridges who are unable to participate in ARP. When a station or wireless Dbridge first joins the spanning tree topology, its addresses are also registered. When a station or wireless Dbridge leaves the spanning tree topology, it sends a "Deregister" message inbound for all wireless Dbridges and stations in its sub-tree and a "Path-Update" message outbound. All wireless Dbridges on path to the root bridge sends "Path-Update" message outbound except the originating link.

In accordance with yet another aspect of the invention, in the downstream direction, every wireless Dbridge carries out a bridge forwarding table lookup and finds the output link for the IP/MAC address of a frame. If an IP entry is not found, a standard ARP process is initiated. In the upstream direction, all packets are forwarded inbound until a wireless Dbridge finds a forwarding table entry for the IP/MAC address of a frame and forwards outbound. If the packet reaches the root bridge, it forwards the packet on its uplink if a forwarding table entry is not found.

Note that Multicast and broadcast forwarding should use both IEEE 802.1 spanning tree protocol methods and IEEE 802.11 techniques as appropriate. If the wireless Dbridges have VLAN trunking capabilities and the radio links are able to carry IEEE 802.1Q tagged frames, GVRP can be used to selectively choose radio-links of the WSTP wireless spanning tree protocol for multicast/broadcast traffic. This can help efficient use of wireless bandwidth when multicast traffic is present.

Thus, a WSTP wireless spanning tree protocol has been defined that integrates the concepts used in the standard IEEE 802.1 spanning tree protocol with a wireless network standard such as the IEEE 802.11 wireless LAN standard for fixed/mobile, multihop, ad-hoc/hybrid, mesh wireless networks. The resulting so-called "wireless spanning tree protocol" (WSTP) is practical, modular, and easy to implement and integrate into existing wireless bridges, repeaters and mobile routers. One advantage is that the WSTP wireless spanning tree protocol re-uses IEEE 802.1 and IEEE 802.11 mechanisms whenever practical.

Much of the above description is terms of the control/management frames that encapsulate the BPDU information being beacons and probe response frames that encapsulate the BPDU information. Those in the art will understand that the invention is applicable to encapsulating the BPDU information in other control/management frames. How to modify the details described herein to accommodate encapsulating BPDU information in other control/management frames will be clear and straightforward to those in the art.

The methodologies described herein are, in one embodiment, performable by a machine which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments, (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspects. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of wireless Dbridge. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium, e.g., a computer program product on a computer-readable storage medium carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media, e.g., a centralized or distributed database, and/or associated caches and servers that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

It should be appreciated that although the invention has been described in the context of the IEEE 802.11 standard, the invention is not limited to such contexts and may be utilized in various wireless network applications and systems, for example in a system that uses packets other than IEEE 802.11 packets, or in a network that conforms to a standard other than IEEE 802.11. Furthermore, the invention is not limited to any one type of architecture or protocol, and thus, may be utilized in conjunction with one or a combination of other architectures/protocols. For example, the invention may be embodied in transceivers conforming to other standards and for other applications, including other WLAN standards, bluetooth, GSM, PHS, CDMA, and other cellular wireless telephony standards.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method in a first wireless mesh node, the method comprising:
   establishing and/or maintaining, in collaboration with other wireless mesh nodes, a wireless spanning tree topology in a wireless mesh network that includes the first wireless mesh node and the other wireless mesh nodes, the wireless mesh network conforming to a wireless network standard, the wireless spanning tree topology according to a wireless spanning tree protocol substantially conforming to a standard IEEE 802.1 spanning tree protocol, the wireless network including the first wireless mesh node and at least two other wireless mesh nodes, the wireless network standard providing a mechanism for a wireless network entity to wirelessly communicate with other wireless network entities using control/management frames for the exchange of wireless network information, the wireless spanning tree protocol acting to determine the spanning tree topology amongst the wireless mesh nodes, including a root wireless node, the establishing and/or maintaining comprising:
      wirelessly transmitting path cost information in the form of one or more path cost information elements to other wireless mesh nodes of the wireless mesh network, the one or more path cost information elements being encapsulated in one or more control/management frames, the path cost information relating to a spanning tree topology containing the first and one or more other wireless mesh nodes,
      wirelessly receiving one or more beacon or probe response frames from one or more other wireless mesh nodes of the network, the received beacon or probe response frames encapsulating path cost information,
   wherein the root wireless node is not required to have a wired network interface,
   wherein each path cost information element includes a path cost designed for wireless communication that has more than one possible value between two mesh nodes that are connectable, and may include a bridging protocol data unit ("BPDU") that substantially conforms to a standard IEEE 802.1 spanning tree protocol BPDU, but with a path cost different than a standard IEEE 802.1 spanning tree protocol BPDU path cost in that the path cost is designed for wireless communication and has more than one possible value for a path between two mesh nodes that are connectable, and
   wherein the wireless network standard provides a mechanism for wireless network entities to wirelessly transmit beacon or probe response frames to other wireless network entities to advertise the radio characteristics of the wireless network entity, and wherein the control/management frames that encapsulate the one or more path cost information elements are beacon or probe response frames, and
   either
   A) wherein the wirelessly transmitting and receiving of the beacon or probe response frames encapsulating the one or more path cost information elements is in a separate, low-rate channel,
   or
   B) wherein the received beacon or probe response frames encapsulate an "I'm alive" message, and the method further includes waiting until a pre-defined number of beacon frames from the other wireless mesh node are missed; and tearing down the radio-link from the other wireless mesh node only after the pre-defined number of beacon frames are missed,
   or
   C) wherein the wireless network includes an uplink to another network, the other network linked to an authenticating server, and the method further comprises the first wireless mesh node establishing security credentials with the authenticating server, the root bridge storing security credentials of all members of the spanning tree topology.

2. A method as recited in claim 1, wherein the wireless standard is the IEEE 802.11 wireless LAN standard.

3. A method as recited in claim 1, wherein a beacon or probe response frame from the first wireless -mesh node includes an indication of whether or not at least one path cost information element is included.

4. A method as recited in claim 1, wherein the encapsulated path cost information comprises one or more path cost information elements, the method further comprising:
   using the encapsulated BPDU information received in the beacon frames from the other wireless mesh nodes to discover the spanning tree topology in the first wireless mesh node's vicinity, and further to find the best path to the root mesh mode of the discovered spanning tree topology in the vicinity, such that a decision as to whether or not to establish a control radio link that includes the first wireless mesh node in the spanning tree topology is possible when the spanning tree topology is first established.

5. A method as recited in claim 1, wherein the encapsulated path cost information comprises one or more path cost information elements, the method further comprising:
   using the encapsulated one or more path cost information elements received in the beacon frames from the other wireless mesh nodes to discover the next other wireless mesh node in the best path to the root mesh node of the spanning tree topology prior to establishing a forwarding radio link with the next other wireless mesh node.

6. A method as recited in claim 1, wherein the encapsulated path cost information comprises one or more path cost information elements and wherein the receiving is as a result of
   sending a probe request frame that contains a request to other wireless mesh nodes to send a probe response frame encapsulating one or more path cost information elements, the method further comprising:

using the encapsulated one or more path cost information elements received in the beacon frames from the other wireless mesh nodes to discover the spanning tree topology in the first wireless mesh node's vicinity, and farther to find the best path to the root mesh node of the discovered spanning tree topology in the vicinity.

7. A method as recited in claim 1, wherein the encapsulated path cost information comprises one or more path cost information elements and wherein the receiving is as a result of sending a probe request frame that contains a request to other wireless mesh nodes to send a probe response frame encapsulating one or more path cost information the method further comprising:

using the encapsulated one or more path cost information received in the probe response frames from the other wireless mesh nodes to discover the next other wireless mesh node in the best path to the root bridge of the spanning tree topology prior to establishing a forwarding radio link with the next other wireless mesh node.

8. A method as recited in claim 1, wherein the receiving is of of a probe request frame, the method-further comprising:

sending one or more probe response frames encapsulating one or more path cost information elements in response to the received probe request frame.

9. A method as recited in claim 1, wherein the encapsulated path cost information includes one or more radio parameters for path cost calculation for the path cost between a receiving wireless mesh node and other wireless mesh nodes.

10. A method as recited in claim 9, wherein the path cost for determining the spanning tree topology is a weighted sum of at least two of the included radio parameters.

11. A method as recited in claim 10, wherein the one or more included radio parameters include one or more of the received signal strength, the available transmission power, a measure of mobility of the first wireless mesh node, and the hop count.

12. A method as recited in claim 11, wherein the first wireless mesh node includes a received signal quality calculator to provide a measure of received signal quality, and wherein the one or more included radio parameters includes the measure of the received signal quality.

13. A method as recited in claim 9, wherein the encapsulated path cost information comprises one or more path cost information elements including path costs, the method further comprising:

storing path costs of encapsulated one or more path cost information elements received from other wireless mesh nodes.

14. A method as recited in claim 13, further comprising:

maintaining a forward-delay timer for a Forward Delay as defined for a standard IEEE 802.1 spanning tree protocol; and when the forward-delay timer expires, establishing a point-to-point radio-link with the wireless mesh node that providing the least-cost path to the root bridge according to the spanning tree topology.

15. A method as recited in claim 1, wherein the encapsulated path cost information comprises one or more path cost information elements including path costs, the method further comprising:

storing path costs of encapsulated one or more path cost information elements received from other wireless mesh nodes.

16. A method as recited in claim 15, farther comprising:

storing radio path costs for alternate and/or backup links to links in the spanning tree topology.

17. A method as recited in claim 1, wherein the encapsulated path cost information comprises one or more path cost information elements, the method further comprising:

storing information on dormant alternate and/or backup links with other wireless mesh nodes;

ascertaining whether or not there is a need to use an alternate and/or backup link; and upon ascertaining the need for a dormant alternate and/or backup link, activating one or more of the dormant alternate and/or backup links according to the stored information.

18. A method as recited in claim 1 wherein the encapsulated path cost information comprises one or more path cost information elements including path costs:

wherein the encapsulated one or more path cost information elements in the received beacon or probe responses include a priority for the transmitting wireless mesh node, the priority measure taking into account whether or not there is an uplink at the wireless mesh node, and wherein the establishing and/or maintaining includes selecting the root bridge, and wherein selecting the root bridge depends on factors including the priority measure wireless mesh nodes.

19. A method as recited in claim 18, wherein the wireless root node is coupled as an uplink to a wired network, and wherein the priority measure further takes into account the link speed of the uplink.

20. A method as recited in claim 18, wherein, in the case there are multiple wireless mesh nodes that have uplinks, each multiple wireless mesh node having an uplink forms a root of a separate spanning tree topology such that multiple spanning tree topologies exist.

21. A method as recited in claim 1, wherein the encapsulated path cost information comprises one or more path cost information elements, the method further comprising:

using the encapsulated one or more path cost information elements received in the beacon frames from the other wireless mesh nodes to discover the spanning tree topology in the first wireless mesh node's vicinity, and farther to find the best path to the root bridge of the discovered spanning tree topology in the vicinity, wherein the encapsulated path cost information provides for the first wireless mesh node to perform mobility operations including one or more of:

negotiating security and QoS parameters with another wireless mesh node;

establishing a logical spanning tree protocol link with another wireless mesh node;

tearing down a logical spanning tree protocol link with a wireless mesh node; and sending the wireless mesh node and station addresses of all the children of the first wireless mesh node in the spanning tree topology wherein the spanning tree topology is established before an uplink wireless link is established.

22. A method as recited in claim 1, wherein the encapsulated path cost information comprises one or more path cost information elements, and wherein the wirelessly transmitting and receiving of the beacon or probe response frames encapsulating the one or more path cost information elements is in a separate, low-rate channel.

23. A method as recited in claim 22, wherein the first mesh node includes two radio transceivers such that the first wireless mesh node can transmit and receive the beacon or probe response frames encapsulating the one or more path cost information elements in the separate, low-rate channel simultaneously to forwarding data.

24. A method as recited in claim 22, wherein the first wireless mesh node includes only a single radio, the method further comprising:
going off-channel to the low-rate control channel to listen for or to transmit beacons encapsulating one or more path cost information elements whenever necessary.

25. A method as recited in claim 1, wherein the encapsulated path cost information comprises one or more path cost information elements including an "I'm alive" message, the method further comprising:
waiting until a pre-defined number of beacons from the other wireless mesh node are missed; and
tearing down the radio-link from the other wireless mesh node only after the pre-defined number of beacon frames are missed.

26. A method as recited in claim 1, wherein the wireless network includes an uplink to another network, the other network linked to an authenticating server, the method further comprising:
the first wireless mesh node establishing security credentials with the authenticating server, and
wherein the root bridge stores security credentials of all members of the spanning tree topology.

27. A first wireless mesh node comprising:
a radio transceiver;
a wireless MAC protocol processor coupled to the radio transceiver, such that the radio transceiver and MAC protocol processor combination is able to wirelessly send and receive frames substantially conforming to a wireless network standard; and
a wireless spanning tree protocol processor coupled to the transceiver and configured to establish an active spanning tree topology in a multi-hop wireless network that includes the first wireless mesh node, the wireless network conforming to the wireless network standard, the wireless network including a plurality of wireless mesh nodes including at least two other wireless network mesh nodes, the wireless network standard providing a mechanism for a wireless network entity to wirelessly communicate with other wireless network entities using control/management frames for the exchange of wireless network information, the active spanning tree topology specifying communication pathways between wireless mesh nodes in the wireless network, the wireless spanning tree protocol processor further configured to maintain information on the spanning tree topology, the active spanning tree topology having a root node, the maintained information including the root node, the establishing being according to a wireless spanning tree protocol that substantially conforms to the standard IEEE 802.1 spanning tree protocol but with a path cost different than a standard IEEE 802.1 spanning tree protocol path cost in that the wireless spanning tree protocol path cost measure is designed for wireless communication and can have more than one possible value between two wireless mesh nodes that are connectable,
wherein the root wireless node is not required to have a wired network interface,
wherein the establishing of the active spanning tree protocol includes receiving spanning tree protocol capabilities from other wireless bridging nodes in control/management frames that encapsulate path cost information as one or more path cost information elements, and announcing the spanning tree protocol capabilities of the first wireless mesh node by transmitting control/management frames that encapsulate path cost information as one or more path cost information elements,
wherein each path cost information element includes the path cost measure designed for wireless communication that has more than one possible value between two mesh nodes that are connectable,
wherein each path cost information element may include one or more bridging protocol data unit ("BPDUs") that substantially conform to standard IEEE 802.1 spanning tree protocol BPDUs, but with a path cost different than a standard IEEE 802.1 spanning tree protocol BPDU path cost in that the path cost is designed for wireless communication and has more than one possible value between two mesh nodes that are connectable,
wherein the wireless network standard provides a mechanism for wireless network entities to wirelessly transmit beacon or probe response frames to other wireless network entities to advertise the radio characteristics of the wireless network entity, and wherein the control/management frames that encapsulate the one or more path cost information elements are beacon or probe response frame, and
either
A) wherein the encapsulated at least one path cost information element provides for a receiving wireless mesh node to discover active spanning tree topologies in the receiving wireless mesh node's vicinity, and further provides for the receiving wireless mesh node to find the best path to the wireless root node of the discovered active spanning tree topology in the vicinity, and wherein the encapsulated at least one path cost information element provides for mobility operations,
or
B) wherein the first wireless mesh node is configured to interpret one or more beacon or probe response frames received via the transceiver from one or more other wireless mesh nodes of the network, the received beacon or probe response frames encapsulating path cost information, and further configured in combination with the transceiver such that the wirelessly transmitting of the control/management frames and receiving of the beacon or probe response frames encapsulating the one or more path cost information elements is in a separate, low-rate channel,
or
C) wherein the first wireless mesh node is configured to interpret one or more beacon or probe response frames received via the transceiver from one or more other wireless mesh nodes of the network, the received beacon or probe response frames encapsulating path cost information including an "I'm alive" message, and further configured to cause the first wireless mesh node to wait until a pre-defined number of beacons from the other wireless mesh node are missed; and to tear down a radio-link from another other wireless mesh node only after the pre-defined number of beacon frames from said another other wireless mesh node are missed.

28. A first wireless mesh node as recited in claim 27, wherein the wireless standard is the IEEE 802.11 wireless LAN standard.

29. A first wireless mesh node as recited in claim 27, wherein a beacon or probe response frame from the first wireless node includes an indication of whether or not at least one cost information element is included.

30. A first wireless mesh node as recited in claim 27, wherein the encapsulated at least one path cost information element provides for a receiving wireless mesh node to discover active spanning tree topologies in the receiving wireless mesh node's vicinity, and further provides for the receiving wireless mesh node to find the best path to the wireless root node of the discovered active spanning tree topology in the vicinity.

31. A first wireless mesh node as recited in claim 30, wherein the encapsulated at least one path cost information element provides for the receiving wireless mesh node to discover the next other wireless mesh node in the best path to the wireless root node prior to establishing a forwarding radio link with the next other wireless mesh node.

32. A first wireless mesh node as recited in claim 30, wherein the encapsulated at least one path cost information element provides for mobility operations.

33. A first wireless mesh node as recited in claim 27, wherein the processing system is configured such that the first wireless mesh node can send a probe request frame that contains a request from other wireless mesh nodes to send a probe response frame encapsulating one or more path cost information elements, such that the first wireless mesh node can discover spanning tree topologies in the first wireless mesh node's vicinity.

34. A first wireless mesh node as recited in claim 27, wherein the processing system is configured to cause the first wireless mesh node to send a probe response encapsulating one or more path cost information elements in response to a received probe request frame from another wireless mesh node that contains a request to send a probe response frame encapsulating one or more path cost information.

35. A first wireless mesh node as recited in claim 27, wherein the encapsulated at least one path cost information element includes one or more radio parameters for path cost calculation for the path cost between a receiving wireless mesh node and other wireless mesh nodes.

36. A first wireless node as recited in claim 35, wherein the path cost for determining the spanning tree topology is a weighted sum of at least two of the included radio parameters.

37. A first wireless mesh node as recited in claim 36, wherein the one or more included radio parameters include one or more of the received signal strength, the received signal quality, the available transmission power, a measure of mobility of the first wireless mesh node, and the hop count.

38. A first wireless mesh node as recited in claim 35, wherein the processing system includes a memory and is configured to cause the first wireless mesh node to store path costs advertised by other wireless mesh nodes.

39. A first wireless mesh node as recited in claim 35, wherein the spanning tree protocol processor maintains a forward-delay timer, such that when the forward-delay timer expires, the first wireless mesh node establishes a point-to-point radio-link with the wireless mesh node that provides the least-cost path to the root bridge according to the spanning tree topology.

40. A first wireless mesh node as recited in claim 27, wherein the processing system includes a memory and is configured to cause the first wireless mesh node to store radio path costs advertised by other wireless mesh nodes.

41. A first wireless mesh node as recited in claim 40, wherein the processing system further is configured to cause the first wireless mesh node to store radio path costs for alternate and/or backup links.

42. A first wireless mesh node as recited in claim 27, wherein the processing system includes a memory and is configured to cause the first wireless mesh node to store information on dormant alternate and/or backup links with wireless mesh nodes, such that, upon the first wireless mesh node determining, using the spanning tree protocol processor, the need for an alternate and/or backup link, a dormant alternate and/or backup link may be activated according to information stored in the first wireless mesh node.

43. An apparatus in a first wireless mesh node, the apparatus comprising:

means for establishing and/or maintaining, in collaboration with other wireless mesh nodes, a spanning tree topology in a wireless mesh network that includes the first wireless mesh node and the other wireless mesh nodes, the wireless mesh network conforming to a wireless network standard, the spanning tree protocol substantially conforming to a standard IEEE 802.1 spanning tree protocol, the wireless network including a first wireless mesh node and at least two other wireless mesh nodes, the means for operating in the first wireless mesh node, the wireless standard providing a mechanism for a wireless network entity to wirelessly communicate with other wireless network entities using control/management frames for the exchange of wireless network information, the means for establishing and/or maintaining comprising:

means for maintaining information in the first wireless mesh node on a spanning tree topology containing the first and one or more other wireless mesh nodes and determined according to a spanning tree protocol that substantially conforms to a standard IEEE 802.1 spanning tree protocol using a wireless network path cost measure, the maintained information including maintaining the identity of a root node of the spanning tree topology;

means for wirelessly transmitting configured to transmit path cost information as at least one path cost information element to other wireless mesh nodes of the network encapsulated in one or more control/management frames, the at least one path cost information element relating to the spanning tree topology; and means for wirelessly receiving configured to receive one or more beacon or probe response frames from one or more other wireless mesh nodes of the network, the received beacon or probe response frames encapsulating path cost information, wherein the root wireless node is not required to have a wired network interface, wherein each path cost information element includes a path cost designed for wireless communication that has more than one possible value between two mesh points that are connectable, and may include a bridging protocol data unit ("BPDU") that substantially conforms to a standard IEEE 802.1 spanning tree protocol BPDU, but with a path cost different than a standard IEEE 802.1 spanning tree protocol BPDU path cost in that the path cost is designed for wireless communication that has more than one possible value between two mesh points that are connectable, and wherein the wireless network standard provides a mechanism for wireless network entities to wirelessly transmit beacon or probe response frames to other wireless network entities to advertise the radio characteristics of the wireless network entity, and wherein the control/management frames that encapsulate the one or more path cost information elements are beacon or probe response frames, and either
A) wherein the means for wirelessly transmitting and the means for wirelessly receiving are configured to wirelessly transmit and wirelessly receive the beacon or probe response frames encapsulating the one or more path cost information elements in a separate, low-rate channel,
or
B) wherein the received beacon or probe response frames encapsulate an "I'm alive" message, and the apparatus further includes means for waiting until a pre-defined number of beacon frames from the other wireless mesh node are missed; and means for tearing down the radio-link from the other wireless mesh node only after the pre-defined number of beacon frames are missed,
or
C) wherein the wireless network includes an uplink to another network, the other network linked to an authenticating server, and the apparatus further comprises means for establishing security credentials with the authenticating server, the root bridge storing security credentials of all members of the spanning tree topology.

44. An apparatus as recited in claim 43, wherein a beacon or probe response frame from the first wireless mesh node includes an indication of whether or not at least one path cost information element is included.

45. An apparatus as recited in claim 43, wherein the encapsulated path cost information comprises one or more path cost information elements, the apparatus further comprising:
means for using the encapsulated at least one path cost information element received in the beacon frames from the other wireless mesh nodes to discover the next other wireless mesh node in the best path to the root bridge of the spanning tree topology prior to establishing a forwarding radio link with the next other wireless mesh node.

46. An apparatus as recited in claim 43, wherein the encapsulated path cost information comprises one or more path cost information elements, and wherein at least one path cost information element includes one or more radio parameters for path cost calculation for the path cost between a receiving wireless mesh node and other wireless mesh nodes.

47. An apparatus as recited in claim 43, wherein the encapsulated path cost information comprises one or more path cost information elements,
the encapsulated at least one path cost information element including a priority for the transmitting wireless mesh node, the priority measure taking into account whether or not there is an uplink at the wireless mesh node, and
wherein the one or more functions includes selecting the root bridge, and wherein selecting the root bridge depends on factors including the priority measure for the wireless mesh nodes.

48. A computer readable storage medium configured with computer readable code that when executed by at least one processor of a processing system that is included in a first wireless mesh node causes the first wireless mesh node to carry out a method, the computer readable storage medium configured with:
code to cause the first wireless mesh node to establish and/or maintain, in collaboration with other wireless mesh nodes, a spanning tree topology for a wireless mesh network that includes the first wireless mesh node and the other wireless mesh nodes, such that the spanning tree topology determined according to a wireless spanning tree protocol substantially conforms to a standard IEEE 802.1 spanning tree protocol, the wireless network conforming to a wireless network standard, the wireless standard providing a mechanism for a wireless network entity to wirelessly communicate with other wireless network entities using control/management frames for the exchange of wireless network information, the wireless spanning tree protocol acting to determine the spanning tree topology amongst the wireless mesh nodes, including a root wireless node;
code to cause the first wireless mesh node to wirelessly transmit path cost information as at least one path cost information element to other wireless mesh nodes of the wireless mesh network, the one or more path cost information elements being encapsulated in one or more control/management frames, the at least one path cost information element relating to a spanning tree topology containing the first and one or more other wireless mesh nodes; and
code to cause the first wireless mesh node to wirelessly receive one or more beacon or probe response frames from one or more other wireless mesh nodes of the network, the received beacon or probe response frames encapsulating at least one path cost information element,
wherein the root wireless node is not required to have a wired network interface, and
wherein each path cost information element includes a path cost designed for wireless communication that has more than one possible value between two mesh nodes that are connectable and wherein each path cost information element may include a bridging protocol data unit ("BPDU") that substantially conforms to a standard IEEE 802.1 spanning tree protocol BPDU, but with a path cost different than a standard IEEE 802.1 spanning tree protocol BPDU path cost in that the path cost is designed for wireless communication and has more than one possible value between two mesh nodes that are connectable, and
wherein the wireless network standard provides a mechanism for wireless network entities to wirelessly transmit beacon or probe response frames to other wireless network entities to advertise the radio characteristics of the wireless network entity, and wherein the control/management frames that encapsulate the one or more path cost information elements are beacon or probe response frames, and
either
A) wherein the wirelessly transmitting and the wirelessly receiving of the beacon or probe response frames encapsulating the one or more path cost information elements in a separate, low-rate channel,
or
B) wherein the received beacon or probe response frames encapsulate an "I'm alive" message, and wherein the computer readable storage medium is further configured with code to cause the first wireless mesh node to wait until a pre-defined number of beacon frames from the other wireless mesh node are missed; and to tear down the radio-link from the other wireless mesh node only after the pre-defined number of beacon frames are missed,
or
C) wherein the wireless network includes an uplink to another network, the other network linked to an authenticating server, and the computer readable storage medium is further configured with code to cause the first wireless mesh node to establish security credentials with the authenticating server, the root bridge storing security credentials of all members of the spanning tree topology.

49. A computer readable storage medium as recited in claim 48, wherein a control/management frame from the first wireless mesh node includes an indication of whether or not at least one path cost information element is included.

50. A computer readable storage medium as recited in claim 48, wherein the wireless network standard provides a mechanism for wireless network entities to wirelessly transmit beacon or probe response frames to other wireless network entities to advertise the radio characteristics of the wireless network entity, and wherein the control/management frames that encapsulate the at least one path cost information element are beacon or probe response frames.

51. A computer readable storage medium as recited in claim 50, wherein the code stored in the storage further comprises:
   code to cause the first wireless mesh node to use the encapsulated at least one path cost information element received in the beacon frames from the other wireless mesh nodes to discover the next other wireless mesh node in the best path to the root bridge of the spanning tree topology prior to establishing a forwarding radio link with the next other wireless mesh node.

52. A computer readable storage medium as recited in claim 50, wherein the encapsulated at least one path cost information element includes one or more radio parameters for path cost calculation for the path cost between a receiving wireless mesh node and other wireless mesh nodes.

53. A computer readable storage medium as recited in claim 50,
   wherein the encapsulated at least one path cost information element in the wirelessly receive one or more beacon or probe response frames from one or more other wireless mesh nodes of the network includes a priority for the transmitting wireless mesh node, the priority measure taking into account whether or not there is an uplink at the wireless mesh node,
wherein the one or more functions includes selecting the root bridge, and wherein selecting the root bridge depends on factors including the priority measure for the wireless mesh nodes.

54. A method in a first wireless network entity, the method comprising:
   running a first instance of a wireless spanning tree protocol that substantially conforms to the standard IEEE 802.1 spanning tree protocol, such that the first wireless network entity acts as a first mesh point of a mesh of wireless mesh points in a wireless network that substantially conforms to a wireless network standard, the wireless network standard providing a mechanism for a wireless network entity to wirelessly transmit beacon or probe response frames to other wireless network entities to advertise the radio characteristics of the wireless network entity,
wherein running an instance of a substantially conforming wireless spanning tree protocol in a particular wireless network entity determines a spanning tree topology instance amongst the wireless mesh nodes, including a root wireless node for the tree topology instance, including:
   maintaining information on the spanning tree topology instance for a set of wireless network entities that includes the particular wireless network entity, the spanning tree topology instance being for wirelessly communicating among the set of wireless network entities, the maintained information including the identity of a root wireless network entity for the spanning tree topology instance;
   wirelessly sending a beacon frame and, in the case a probe request frame was received that includes a path cost information request, a probe response frame, the beacon and/or probe response frame including an indication that path cost information including at least one path cost information element is encapsulated, wherein each path cost information element includes a path cost designed for wireless communication that has more than one possible value between two mesh nodes that are connectable, and wherein each path cost information element may include a bridging protocol data unit ("BPDU") information that substantially conforms to a standard IEEE 802.1 spanning tree protocol BPDU information, but with a path cost different than a standard IEEE 802.1 spanning tree protocol BPDU path cost in that the path cost is calculated according to wireless information and has more than one possible value between two mesh nodes that are connectable; and
   as a result of receiving a beacon frame or probe response frame, ascertaining if the received beacon or probe response frame encapsulate path cost information, and if there is encapsulated path cost information, updating the maintained information on the first spanning tree topology, and accordingly modifying any at least one path cost information element for sending in an encapsulated beacon frame or probe response,
wherein each root wireless node for a respective tree topology instance is not required to have a wired network interface,
wherein the wireless network standard provides a mechanism for wireless network entities to wirelessly transmit beacon or probe response frames to other wireless network entities to advertise the radio characteristics of the wireless network entity, and wherein the control/management frames that encapsulate the one or more path cost information elements are beacon or probe response frames, and
   either
   A) wherein in running an instance, the wirelessly transmitting and receiving of the beacon or probe response frames encapsulating the one or more path cost information elements is in a separate, low-rate channel,
   or
   B) wherein in running an instance, the received beacon or probe response frames encapsulate an "I'm alive" message, and the running an instance further includes waiting until a pre-defined number of beacon frames from the other wireless mesh node are missed; and tearing down the radio-link from the other wireless mesh node only after the pre-defined number of beacon frames are missed,
   or
   C) wherein the wireless network includes an uplink to another network, the other network linked to an authenticating server, and the running an instance further comprises the first wireless mesh node establishing security credentials with the authenticating server, the root bridge storing security credentials of all members of the spanning tree topology.

\* \* \* \* \*

UNITED STATES PATENT AND TRADEMARK OFFICE
CERTIFICATE OF CORRECTION

| | | |
|---|---|---|
| PATENT NO. | : 7,653,011 B2 | Page 1 of 1 |
| APPLICATION NO. | : 11/351433 | |
| DATED | : January 26, 2010 | |
| INVENTOR(S) | : Rahman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 883 days.

Signed and Sealed this

Twenty-eighth Day of December, 2010

David J. Kappos
*Director of the United States Patent and Trademark Office*